US008447731B1

(12) United States Patent
Madhava et al.

(10) Patent No.: US 8,447,731 B1
(45) Date of Patent: May 21, 2013

(54) METHOD AND SYSTEM FOR INFORMATION MANAGEMENT

(75) Inventors: Rakesh Madhava, Chicago, IL (US);
Benjamin R. Wolf, Middleton, WI (US);
S. Courtney Gray, Chicago, IL (US)

(73) Assignee: Nextpoint, Inc, Chicago, IL (US)

( * ) Notice: Subject to any disclaimer, the term of this patent is extended or adjusted under 35 U.S.C. 154(b) by 0 days.

(21) Appl. No.: 12/552,936

(22) Filed: Sep. 2, 2009

Related U.S. Application Data

(63) Continuation-in-part of application No. 12/098,317, filed on Apr. 4, 2008, which is a continuation-in-part of application No. 11/828,969, filed on Jul. 26, 2007, which is a continuation-in-part of application No. 12/059,636, filed on Mar. 31, 2008.

(60) Provisional application No. 61/093,652, filed on Sep. 2, 2008, provisional application No. 60/820,363, filed on Jul. 26, 2006.

(51) Int. Cl.
*G06F 17/30* (2006.01)

(52) U.S. Cl.
USPC .......................................... 707/636

(58) Field of Classification Search
None
See application file for complete search history.

(56) References Cited

U.S. PATENT DOCUMENTS

| 5,444,615 | A | 8/1995 | Bennett et al. |
|---|---|---|---|
| 5,633,918 | A | 5/1997 | Mankovitz |
| 5,781,915 | A | 7/1998 | Kohno et al. |
| 5,838,966 | A | 11/1998 | Harlan |
| 6,839,707 | B2 | 1/2005 | Lee et al. |
| 7,197,716 | B2 | 3/2007 | Newell et al. |
| 2002/0065848 | A1 | 5/2002 | Walker et al. |
| 2002/0083079 | A1* | 6/2002 | Meier et al. ................. 707/104.1 |
| 2002/0089533 | A1 | 7/2002 | Hollarr et al. |
| 2003/0028731 | A1* | 2/2003 | Spiers et al. .................. 711/147 |
| 2003/0051021 | A1* | 3/2003 | Hirschfeld et al. ........... 709/223 |
| 2004/0085354 | A1 | 5/2004 | Massand |
| 2004/0260569 | A1 | 12/2004 | Bell et al. |
| 2004/0261016 | A1 | 12/2004 | Glass et al. |
| 2005/0034063 | A1 | 2/2005 | Baker et al. |
| 2005/0086179 | A1 | 4/2005 | Mehmet |
| 2005/0097790 | A1 | 5/2005 | Sawada |
| 2005/0240578 | A1 | 10/2005 | Biederman et al. |
| 2005/0289512 | A1 | 12/2005 | Matsusaka |
| 2006/0085469 | A1 | 4/2006 | Pfeiffer et al. |
| 2006/0101382 | A1 | 5/2006 | Jeffries |
| 2007/0271517 | A1* | 11/2007 | Finkelman et al. ........... 715/742 |
| 2009/0006472 | A1 | 1/2009 | Bush et al. |
| 2009/0019389 | A1 | 1/2009 | Aust |

(Continued)

OTHER PUBLICATIONS

Non-Final Office Action dated Sep. 10, 2009 with regard to U.S. Appl. No. 11/828,969.

(Continued)

*Primary Examiner* — Yuk Ting Choi
(74) *Attorney, Agent, or Firm* — Cotman IP Law Group, PLC

(57) ABSTRACT

A system and method is described for managing litigation services, such as the designation of exhibits, deponents and other information for one or more cases. The method including the steps of receiving trial information and populating a database with the trial information. The method next includes the step of designating portions of the trial information for later use, followed by receiving confirmation of acceptance of the designated portions. Finally, the method includes the step of managing the designation and use of the trial information.

9 Claims, 21 Drawing Sheets

U.S. PATENT DOCUMENTS

2009/0043878 A1* 2/2009 Ni .................................. 709/223
2009/0094086 A1 4/2009 Bruno et al.
2009/0150906 A1* 6/2009 Schmidt et al. ............... 719/317

OTHER PUBLICATIONS

Non-Final Office Action dated Sep. 23, 2009 with regard to U.S. Appl. No. 12/059,636.

Final office action dated Mar. 24, 2010 with regard to U.S. Appl. No. 11/828,969.

Final office action dated Apr. 22, 2010 with regard to U.S. Appl. No. 12/059,636.

Response to Non-final OA dated Sep. 23, 2009 for U.S. Appl. No. 12/059,636, filed Jun. 22, 2010.

Response to Final Office Action dated Apr. 22, 2010 to receive Advisory Action with regard to U.S. Appl. No. 12/059,636, filed Jun. 22, 2010.

Advisory Action dated Jul. 15, 2010 with regard to U.S. Appl. No. 12/059,636.

Response to Final Office Action dated Apr. 22, 2010 and to Advisory Action for U.S. Appl. No. 12/059,636, filed Aug. 27, 2010.

Response to Final Office Action dated Mar. 24, 2010 to receive Advisory Action with regard to U.S. Appl. No. 11/828,969, filed May 24, 2010.

Advisory Action dated Jun. 18, 2010 with regard to U.S. Appl. No. 11/828,969.

Non-final Office Action dated Jul. 8, 2010 with regard to U.S. Appl. No. 12/098,317.

Response to Office Action dated Jul. 8, 2010 with regard to U.S. Appl. No. 12/098,317, filed Oct. 7, 2010.

Final Office Action dated Dec. 29, 2010 with regard to U.S. Appl. No. 12/098,317.

Response to Final Office Action dated Dec. 29, 2010 to receive Advisory Action with regard to U.S. Appl. No. 12/098,317, filed Feb. 28, 2010.

Advisory Action dated Mar. 15, 2011 with regard to U.S. Appl. No. 12/098,317.

Nonfinal Office Action dated Apr. 28, 2011 for U.S. Appl. No. 12/098,317.

Response to Nonfinal Office Action dated Apr. 28, 2011 for U.S. Appl. No. 12/098,317.

Final Office Action dated Oct. 19, 2011 for U.S. Appl. No. 12/098,317.

* cited by examiner

NEXTPOINT
TRIAL MANAGER
Welcome, User Name, you are logged in    January 1, 2005, 12:00 P.M.

All Active Cases    Smith v. Jones > Current Designations > Smith, James S.

Current
Designations — 244    Expand All    Collapse All    Send to Excel    Send to Printer    Send to PDF — 252

Exchange
Center    ☐ Exhibits (add)
    246
    60a
    DX 001
    DX 002
    DX 003
    DX 004
    DX 005
            248    250

PDF
Center

Plaintiff
Designations — 240a    ☐ Deponents (add)
    60b
    ☐ ☐ Smith, James S.
            Volume I
            03:03 - 03:23    through "as I said." — 300
            12:05 - 12:12
            23:10 - 23:18
            35:08 - 37:15 — 300
            76:12 - 79:04
            ☐ Jones, Julius
            ☐ Adams, John
            ☐ Smith, James S.

METHOD AND SYSTEM FOR INFORMATION MANAGEMENT

CROSS-REFERENCE

This application claims the priority of U.S. Provisional Patent Application No. 61/093,652 filed on Sep. 2, 2008 and is a continuation-in-part of U.S. patent application Ser. No. 12/098,317 filed on Apr. 4, 2008, which is a continuation-in-part of U.S. patent application Ser. No. 11/828,969 filed on Jul. 26, 2007, which claims the priority of U.S. Provisional Patent Application No. 60/820,363 filed on Jul. 26, 2006 and this application is a continuation-in-part of U.S. patent application Ser. No. 12/059,636 filed on Mar. 31, 2008, which is a continuation-in-part of U.S. patent application Ser. No. 11/828,969; which claims the priority of U.S. Provisional Patent Application No. 60/820,363 filed on Jul. 26, 2006. These applications are incorporated herein by reference in their entirety.

BACKGROUND OF THE INVENTION

This invention relates generally to a method and system for managing information and more specifically, to tracking information in connection with litigation support services.

One application for the current invention is providing online litigation services, such as managing the designation of exhibits, deponents and other information for one or more cases. Currently, it is most common for these services to be provided by secretaries or paralegals via spreadsheets designed to calculate numbers and perform mathematical tasks rather than organizational tasks.

SUMMARY OF THE INVENTION

A system and method is described for managing litigation services, such as the designation of exhibits, deponents and other information for one or more cases.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF DRAWINGS

For a better understanding of the invention, reference may be had to the following Figures, which further describe an embodiment of the present invention and which include drawings and exemplary screen shots therefor:

FIG. 16 shows an exemplary screen shot of a Plaintiff Designations window for use with the first embodiment of the present invention.

FIG. 18 shows an exemplary screen shot of a Deposition window for use with an embodiment of the present invention.

DETAILED DESCRIPTION

Figure 1:
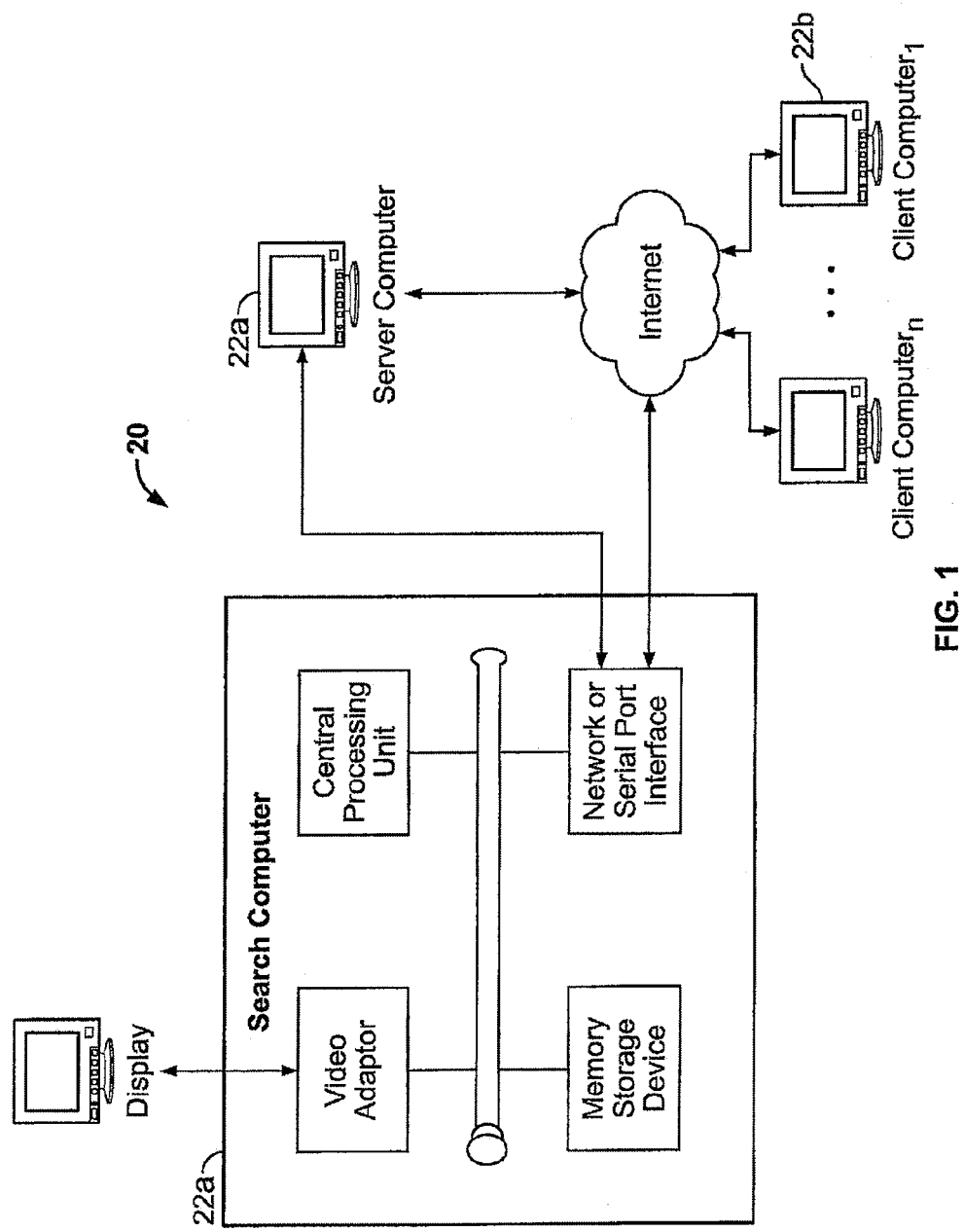
FIG. 1 is a diagram depicting a computer network on which an embodiment of the invention may be operated.

Turning now to the Figures, wherein like reference numerals refer to like elements, there is illustrated a system and method for managing trial information and generating respective standardized reports that can be used for efficiently tracking the status of the trial information. Although not required, the system and method will be described in the general context of a computer network 20, as is well know in the industry, and computer executable instructions being executed by general purpose computing devices within the computer network 20. In this regard, the general purpose computing devices may comprise one or more remote computers 22a, and one or more server computers 22b, hosting a software application 30. The server computer 22b can also include one or more databases 24 for storing trial information. Trial information can include exhibits, deponent names, deponent transcripts, case names or any other information that could be introduced at trial.

To allow each of the remote computers 22a to access and utilize the information management system 10 without storing copies of the software application 30 on each of those computers 22a, the software application 30 may reside on the server computer 22b. Further, it is preferable that users access the software application 30 via an internet browser 40, which acts as an interface between the software application 30 and the operating system for the remote computer 22a. Although the operating system for the server computer 22b is preferably Windows® based, it should be understood that the server computer 22b could employ any one of the currently existing operating systems, such as LINUX®, MAC OS®, Mozilla®, etc. In addition, it should be appreciated by those with skill in the art that other applications besides the browser may also be utilized to act as an interface between the software application 30 and the remote computers 22a.

Figure 2:
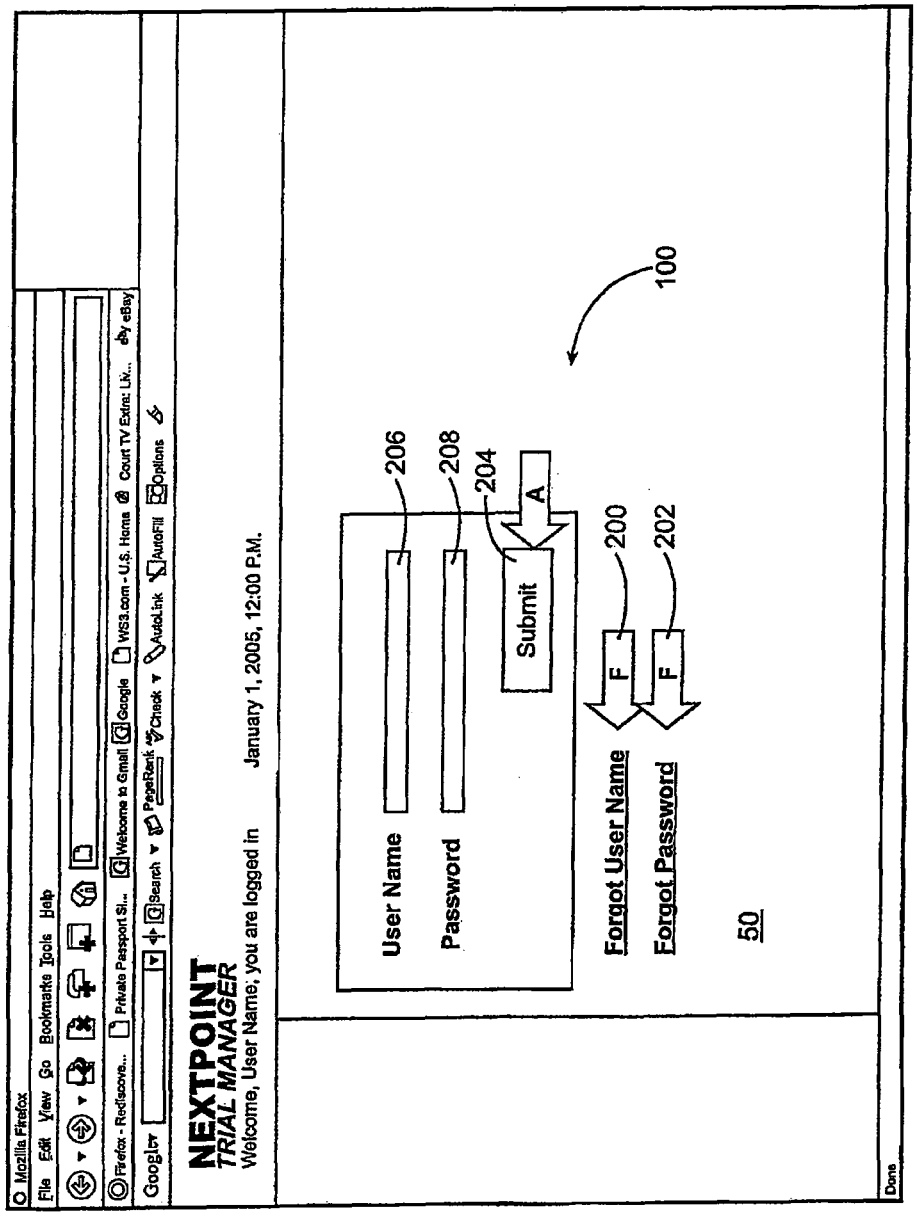
FIG. 2 shows an exemplary login page for use in the present invention.

For editing, populating and maintaining the databases 24, the browser 40 includes a graphical user interface 50. As shown in FIG. 2, the graphical user interface 50 is further comprised of various menu bars, drop-down menus, buttons and display windows. A detailed description of the graphical user interface 50, the menu bars, drop-down menus, exemplary buttons and display windows, along with a brief description of the functionality associated with those menus, buttons and windows, is described below and in the accompanying Figures.

As will be appreciated by those of skill in the art, the computers 22a, 22b need not be limited to personal computers, but may include hand-held devices, multiprocessor systems, microprocessor-based or programmable consumer electronics, minicomputers, mainframe computers, personal digital assistants, cellular telephones or the like depending upon their intended end use within the system. For performing the procedures described hereinafter, the computer executable instructions may be written as routines, programs, objects, components, and/or data structures that perform particular tasks. Within the computer network 20, the computer executable instructions may reside on a single computer 22a, or server computer 22b, or the tasks performed by the computer executable instructions may be distributed among a plurality of the computers 22a, 22b. Therefore, while described in the context of a computer network, it should also be understood that the present invention may be embodied in a stand-alone, general purpose computing device that need not be connected to a network.

To efficiently provide users with access to the software application 30, the server computers 22b and the underlying framework for the computer network 20 may be provided by the service company itself or by outsourcing the hosting of the software application 30 to an application service provider ("ASP"). ASP's are companies that provide server computers that store and run a software application for a third party entity, which is accessible to the third party entity's users via the Internet or similar means. Therefore, the server computer for operating the software application may be hosted on a computer that is owned and maintained by another party and users may then access and use software applications via the host computer without storing the software application on the remote computers. It should be understood, however, that ASP models are well-known in the industry and should not be viewed as a limitation with respect to the type of system architectures that are capable of providing a computer network 20 that can properly operate the software application discussed herein.

To perform the particular tasks in accordance with the computer executable instructions, the computers 22a, 22b may include, as needed, a video adapter, a processing unit, a system memory, and a system bus that couples the system memory to the processing unit. The video adapter allows the computers 22a, 22b to support a display, such as a cathode ray tube ("CRT"), a liquid crystal display ("LCD"), a flat screen monitor, a touch screen monitor or similar means for displaying textual and graphical data to a user. The display allows a user to view information, such as, code, file directories, error logs, execution logs and graphical user interface tools.

The computers 22a, 22b may further include read only memory (ROM), a hard disk drive for reading from and writing to a hard disk, a magnetic disk drive for reading from and writing to a magnetic disk, and/or an optical disk drive for reading from and writing to a removable optical disk or any other suitable data storage device. The hard disk drive, magnetic disk drive, and optical disk drive may be connected to the system bus by a hard disk drive interface, a magnetic disk drive interface, or an optical disk drive interface, respectively, or other suitable data interface. The drives and their associated computer-readable media provide a means of non-volatile storage for the computer executable instructions and any other data structures, program modules, databases, arrays, etc. utilized during the operation of the computers 22a, 22b.

To connect the computers 22a, 22b within the computer network 20, the computers 22a, 22b may include a network interface or adapter. When used in a wide area network, such as the Internet, the computers 22a, 22b typically include a network interface, such as a router/modem or similar device. The modem, which may be internal or external, is connected to the system bus for the computer via a serial port interface or other communication port. It will be appreciated that the described network connections are exemplary and that other means of establishing a communications link between the computers 22a, 22b may be used. For example, the system may also include a wireless router/modem that receives and transmits information via a wireless communications medium, such as a cellular communications network, a satellite communications network, or another similar type of wireless network. It should also be appreciated that the network interface will be capable of employing TCP/IP, FTP, SFTP, Telnet SSH, HTTP, SHTTP, RSH, REXEC, etc. and other network connectivity protocols.

As mentioned above, in one embodiment, the software application 30 and databases 24 reside on the server computer 22b and are managed by the provider of the software application 30 or by a third-party. Those with skill in the art will understand, however, that the software application 30 and databases 24 may reside on the remote computer 22a and may be managed and maintained by a user. The software application 30 and databases 24 may also reside on different computers. The graphical user interface 50 may load web pages via HTTP or HTTPS or any other suitable format and displays those web pages on the browser 40.

As seen below, system 30 may be employed to store and process electronically stored litigation data 6010, which may include documents, emails, deposition transcripts, photographs, or other similar types of evidence that may be used during the litigation of a case. To alleviate the processing resources necessary to store and process the constantly and exponentially increasing amount of electronically stored litigation data 6010 being generated in the field of litigation, the system may utilize additional computational resources that are available via a cloud computing network 6000. The term "cloud computing" refers to the use of computational resources that are available remotely over a public network, such as the internet, and that are generally provided at a low cost and on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

In this embodiment, the software application 30 and databases 24 may reside on a computer that is connected to a cloud computing network 6000 or the software application 30 and databases 24 may reside on a computer that forms part of cloud computing network 6000. The cloud computing network 6000 may also be used to process electronically stored litigation data 6010 that may be required for a trial, litigation, eDiscovery or other evidence management applications as seen below. In some cases, electronically stored litigation data 6010 associated with discovery may comprise several million pages of documents, and can be as large as multiple terabytes of information. The ability to use low-cost alternatives to traditional computing needs, therefore, may have a significant impact on reducing the cost and resources necessary to conduct discovery and to conform to federal, state, and international legal requirements for maintaining and producing information and documents.

As described in detail below, electronically stored litigation data 6010 may be converted and/or processed in a variety of different manners. For example, the system may perform full-text and meta-data extraction, physical alteration of electronically stored litigation data 6010 (such as stamping or numbering), indexing of data to create searchable indexes, and maintain corresponding relational database structures. This processing is extremely demanding of computational resources such as computer memory, processing, bandwidth, and storage. Because this processing is a precursor to other eDiscovery and evidence management tasks, it is critical that it be performed as quickly as possible. However, due to the time constraints that are usually involved, the use of traditional computing resources is cost prohibitive in some instances.

Figure 20:
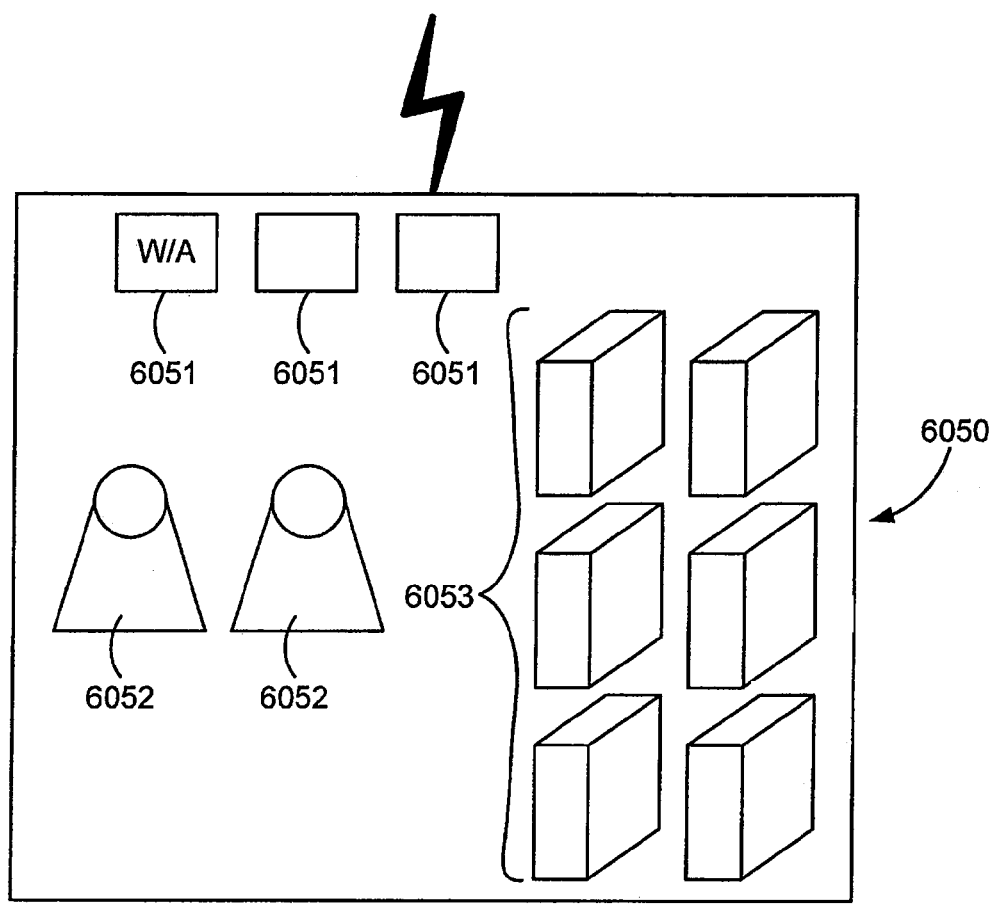
FIG. 20 shows a private network.

Those with skill in the art will recognize that different forms of distributed processing exist and that other concepts related to distributed processing could also be applied to the present system. For example, FIG. 20 depicts a private network 6050, which may include a plurality of web applications 6051, a plurality of primary database storage discs 6052 and a plurality of computers 6053, which are linked together via an intranet or similar network. In the embodiment depicted in FIG. 20, the processing and storage of the various electronically stored litigation data 6010 all takes place on site, and is done via computers 6053 that are located on site and connected to the private network. Therefore, the only way to increase processing speed or storage space is to increase the number of physical computers 6053 that are connected to the private network. This is economically inefficient since the system provider must maintain a large number of computers that are not utilized on a regular basis. The use of a cloud computing network may help to alleviate the extreme demands placed on traditional computational resources, and dramatically decrease the cost associated with processing electronically stored litigation data 6010 as described above.

Figure 21:
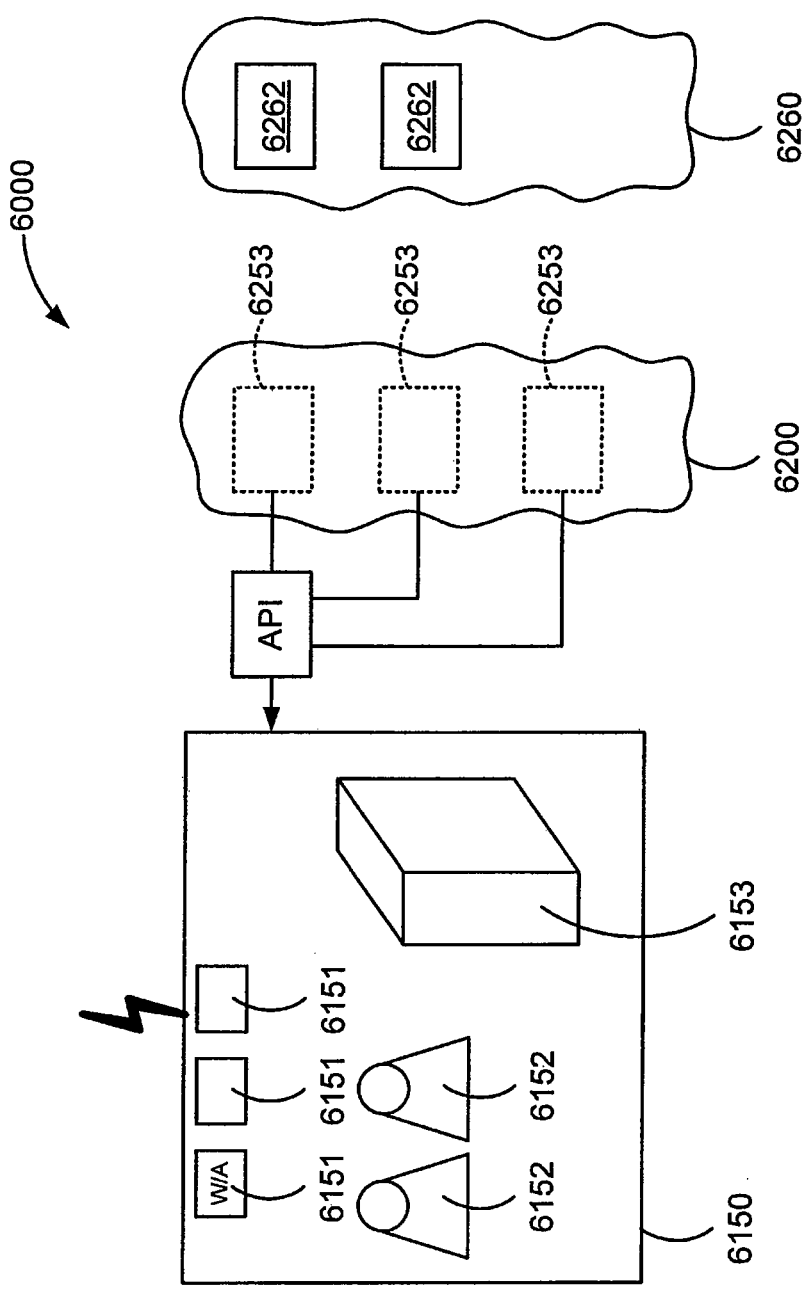
FIG. 21 shows a private network used in connection with multiple cloud computing architectures.

In the embodiment depicted, for example, in FIG. 21, such economic and physical restrictions are reduced greatly. FIG. 21 depicts a variation of cloud computing architecture 6000, which may comprise private network, or web host, 6150. Private network 6150 may comprise a plurality of web applications 6151, a plurality of primary data base storage discs 6152, and a computer or server 6153.

As seen, cloud computing architecture 6000 leverages expandable virtual computing cloud 6200 to rapidly provision computational resources as needed, and release the resources when complete. Specifically, cloud computing architecture 6000 creates a plurality of virtual computers 6253 to process electronically stored litigation data 6010 as needed. This makes it possible to process extremely large amounts of electronically stored litigation data 6010 without the constant overhead of a private network architecture comprising several private computers. By way of example, and in no way limiting, three hypothetical scenarios are stated below to demonstrate the use of cloud computing architecture 6000:

Scenario #1:

As stated above, each virtual computer 6253 is comprised of computational resources that are connected to a public network, such as the internet, and are available. In this first scenario, a first service provider owns a first and a second physical server, each of which is similar to servers 6053 described above. The first and the second physical server are each being used by the service provider, but each is only being used at 60% capacity, leaving 40% of their respective capacities unused. Additionally, each physical server is connected to a public network. A second service provider, who employs a cloud computing architecture similar to cloud computing architecture 6000, requires 60% of the capacity of a server similar to the first service provider's two physical servers, but the second service provider only needs those resources for an hour. Cloud computing architecture 6000 may leverage the unused 40% capacity of the first physical server, and combine it with ½ of the unused 40% capacity of the second physical server (or 20% of the total capacity) to create a virtual computer 6253 that is using the same 60% of the physical servers. In the alternative, cloud computing architecture 6000 may leverage and combine ¾ of the unused 40% capacity of each physical server (or 30% of the total capacity apiece) to provide a virtual computer 6253 that is using the same 60% of the physical servers.

Scenario #2:

Cloud computing architecture 6000 may provision a plurality of virtual computers 6253 in expandable virtual computing cloud 6200 to process a first large number of documents as described in detail below. Depending on the type of processing required, the processing may be completed in about an hour. When completed, cloud computing architecture 6000 releases virtual computers 6253 and allows the computational resources to perform other tasks.

However, if a second customer requires a second large number of documents to be processed while the first large number of documents is still being processed, cloud computing architecture 6000 may provision an additional plurality of virtual computers 6253. Such additional provision will take a brief amount of time to be manually initialized. In a second embodiment, such initialization may be actuated automatically, requiring no manual input. Regardless, in short amount of time, cloud computing architecture 6000 may begin to process the second large number of documents. To replicate this performance on a private network, such as network 6050 depicted in FIG. 20, a service provider would be required to purchase not only the initial plurality of servers, but would either be required to purchase the additional plurality of servers, or have the additional plurality of servers idling on site. Either scenario introduces an extraordinary cost to the service provider, which must be passed along to the customer.

Scenario #3:

A user requests, through web application 6151, that a large number of documents, which had previously been entered into the system, be Bates stamped. The manner in which the documents are uploaded or downloaded is well known, and may include uploading to a web server through a browser by way of SSL. Regardless of how the documents are uploaded, cloud computing architecture 6000 would provision the necessary number of virtual computers 6253. In order to provision the necessary number of virtual computers 6253, cloud computing architecture 6000 may proceed through the following steps:

1. The host computer sends out a request to a cloud computing network for additional computing resources. The additional computing resources are defined as either physical servers or virtual servers; each on having dedicated computational resources such as hard disk, memory, processor abilities, etc.
2. Cloud computing network 6000 replies and indicates the amount of available resources. Cloud computing network 6000 responds with the status of each virtual server. Once available, cloud computing network 6000 provides an IP address for each virtual server. Cloud computing network 6000 also provides an API for the service provider, in order to list the currently available servers, and each server's status and IP address.
3. The cloud computing network provides the necessary network protocols for allowing the secure exchange of data between the host computer and the cloud computing network.
4. Each virtual server communicates to the service provider's primary, physical servers by way of a secure web services API.
5. The host computer provides processing instructions to the cloud computing network. This may be done through a web services API, such as extensible markup language (XML) or other such language.
6. The cloud computing network receives the data and directs it to a plurality of virtual computers. In order to accomplish this, the host computer breaks down the electronically stored litigation data 6010 into its smallest block of information that may be processed at one time, which is determined by the type of processing required, then commands each virtual server to process the next available block of information. By way of example, if 1,000,000 pages of documents are to be Bates stamped, the smallest block of information is one page. In this manner, the host computer will tell each virtual computer to take the next available page and Bates stamp it. On a different occasion, the smallest block of information that may be processed is by document, rather than by page. In this instance, the host computer will tell each virtual server to process the next available document.
7. Once virtual computers 6253 process the large number of documents, they will store the original documents, along with the newly processed documents, in storage location 6260. As stated below, storage location 6260 may comprise a plurality of physical servers, or may comprise a plurality of virtual servers. Virtual computers 6253 will then indicate on primary database discs 6152 where the newly processed documents are stored. The newly processed documents may be stored in the same file format as the original documents as well as a format compatible with the service provider's web interface.
8. The host computer makes the modified data available to the user.

To process the electronically stored litigation data 6010, each virtual computer 6253 would publish its application program interface (API) for securely receiving authenticated instructions via the internet, and request the storage location of the documents from primary database 6152. The virtual computers 6253 would then retrieve the documents from storage location 6260. In the depicted embodiment, storage location 6260 comprises a plurality of virtual servers 6262, however, it will be appreciated by those in the art that storage location 6260 may comprise physical servers or a combination of physical servers and virtual servers.

It will be appreciated by those in the art that, due to the space limitations inherent under systems similar to those depicted in FIG. 20, service providers only process electronically stored litigation data 6010 when requested, and only do the processing that is required at the time. By way of example, a service provider may store a large number of documents for a customer and the customer may ask the service provide to make the documents keyword searchable by using Optical Character Recognition ("OCR") software to convert the documents into a searchable format. When a customer requests OCR conversion, the service provider may convert the large number of documents and store both the original documents and the OCR documents in its computers 6053. The process of converting a large number of documents to a searchable format requires significant processing bandwidth and a great deal of storage space to store both the original version of the documents and the OCR version of the documents. This type of request in addition to the outstanding requests for other customers may create a large spike in the demand for the service provider's computational resources, which requires more computers to be kept on hand by the service provider or which increases the time required to complete the job request. A large spike in the demand for computational resources may also occur in connection with request to bates stamp documents or to change the document format of documents.

Under the embodiment depicted in FIG. 21, the service provider may provision the requisite number of virtual computers to process and store the documents on a real-time basis or within a predetermined amount of time. The amount of turnaround time necessary to process the documents is customizable and may be selected by the customer or the service provider.

For populating the databases 24, data may be loaded directly from application end users or programmatically through command line tools or scripting. While the software application 30 may be programmed in any software language capable of producing the desired functionality, it is envisioned that the software application 30 will be programmed using Ruby on Rails (commonly referred to as "RoR," or simply "Rails").

To edit, populate and maintain the databases 24, the graphical user interface 50 may allow the user to perform standard text editing functions, including, mouse placement of the cursor, click-and-drag text selection and standard Windows® key combinations for cutting, copying and pasting data. In addition, the graphical user interface 50 may allow users to access, copy, save, export or send data or files by using standard Windows® file transfer functions. It should be understood that these editing and file transfer functions may also be accomplished within other operating system environments, such as LINUX®, MAC OS®, Mozilla®, etc.

I. Login Page

For maintaining the security associated with the software application 30 and databases 24, a unique login window 100 may be maintained for each company/user. The login window 100 may also be used to control the access privileges for various levels of users. As shown in FIG. 2, each login window 100 may also require a user name and password. For security purposes, the user names and passwords may be kept separately for each company that is accessing the software application 30. To gain access to the software application 30, the user must enter a proper user name in the user name field 206 and password in the password field 208 and press the submit button 204. If the user has forgotten the user name 206, the user may click on the Forgot User Name link 200 for assistance. If the user has forgotten the password 208, the user may click on the Forgot Password link 202.

A. Forgotten User Name or Password

Figure 3:
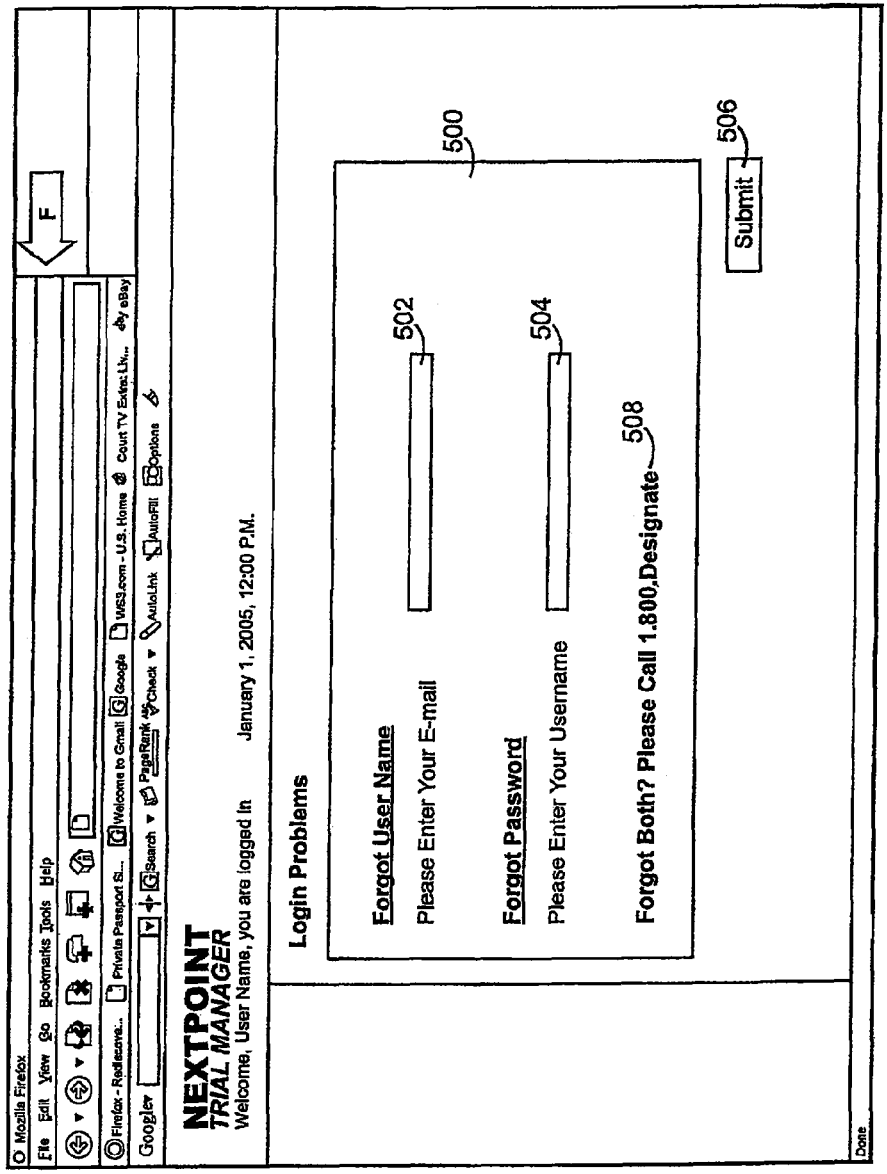
FIG. 3 shows an exemplary screen shot of a Login Problems window for use with the first embodiment of the present invention.

To enable a user to gain access to software application 30 if the user has forgotten the User Name or Password, a Login Problems window 500 may be provided. To access the Login Problems window 500, either the Forgot User Name link 200 or the Forgot Password link 202 may be selected. FIG. 3 depicts Login Problems window 500. As shown, Login Problems window 500 may include email space 502 and username space 504. In the exemplary embodiment, the user will have submitted a valid email address prior to receiving permission to use software application 30. In this way, if a user has forgotten the user name 206, the user may enter the user's email address in email space 502 and press submit button 506. Software application 30 will then send an email to the user's email address that includes the user name 206.

If the user has forgotten the password 208, the user may enter the user name 206 in username space 504 and press submit button 506. Software application 30 will then search the database for the username, and send an email that includes the password 208 to the email address that is associated with the user name 206. To aid a user who has forgotten both the user name 206 and the password 208, an information panel 508 may also be provided in Login Problems window 500. The information panel 508 may include contact information for a user support office or a link to additional information that could assist the user with the login procedure.

It should be appreciated that different login procedures may be employed, which are well know in the industry, on an as-needed basis, including login procedures that employ biometrics, such as fingerprints, retinal scans, etc.

II. All Active Cases/Trial Management (Home Pace)

Figure 4:
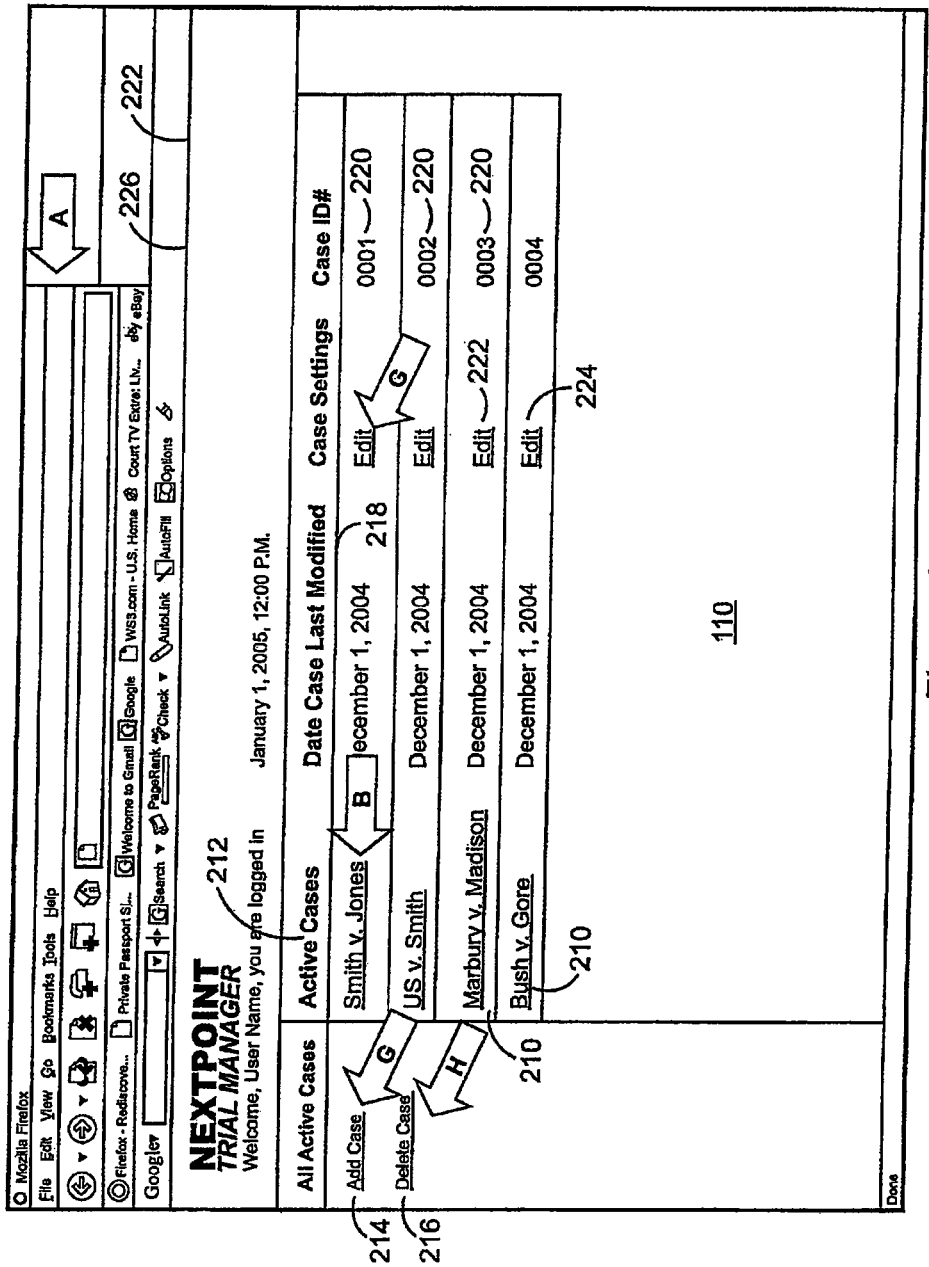
FIG. 4 shows an exemplary screen shot of a Trial Management window for use with a first embodiment of the present invention.

While the system 10 can be used for any application in which it would be desirable to manage information 60, the following description discusses the system 10 in the context of providing litigation support services. As shown in FIG. 4, the system 10 may be used to manage more than one case 210 by allowing the user to access a Trial Management window 110. The Trial Management window 110 may be accessed by entering a valid user name 206 and password 208 on the Login window 100 and selecting the Submit link 204 as described above. The cases 210 that are being managed by the system 10 are listed on the Trial Management window 110 in the Active Cases column 212.

As seen in FIG. 4, for each of the cases 210 being managed by the system 10, various information is also shown. For example, a Date Case Last Modified column 218 may be provided that includes information about when a specific case 210 was last modified. A Case ID# column 222 may also be provided that includes a case number 220 for each of the listed cases 210. To edit cases 210, each case 210 may include a corresponding Edit button 224. The Edit buttons 224 are shown in FIG. 4 under the Case Settings column 226.

A. Adding a Case to the Trial Management Window

Figure 5:
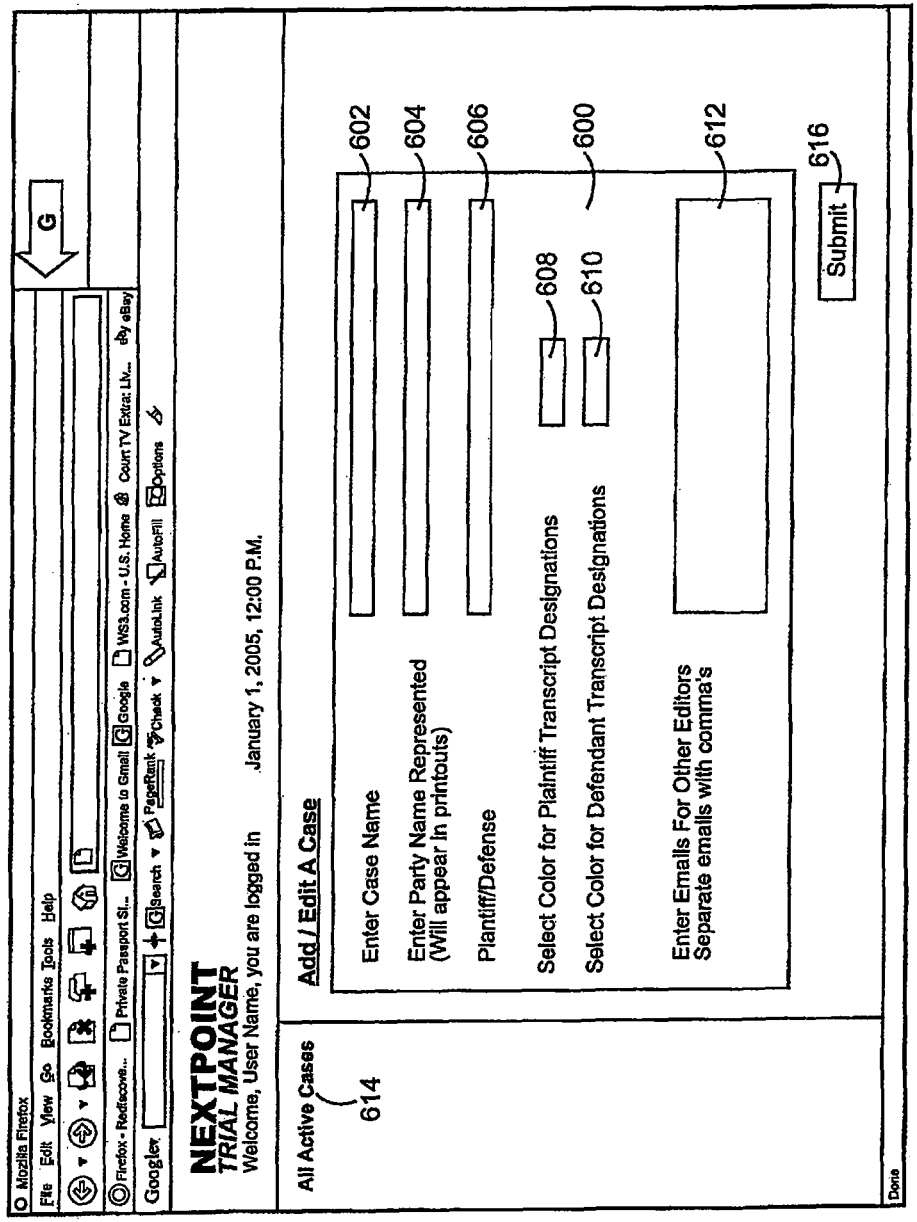
FIG. 5 shows an exemplary screen shot of an Add/Edit A Case window for use with the first embodiment of the present invention.

To aid the user in adding a case 210 to the system 10, an Add/Edit A Case window 600 may be provided, which can be accessed by selecting add case link 214 provided in Trial Management window 110. The Add/Edit A Case window 600 may include multiple areas to enter various data or information pertinent to a specific case 210. In the embodiment depicted in FIG. 5, a user can enter a Case Name or Case Caption in case name area 602. A user may also enter a description of the party's name in represented area 604, and can identify whether the user is the plaintiff or defendant in plaintiff/defense area 606. As some courts require different colored cover sheets to differentiate which party is submitting the documents, a plaintiff color area 608 and defendant color area 610 may also be provided in Add/Edit A Case window 600. The Add/Edit A Case window 600 may also include email area 612 to enter the various emails of the attorneys associated with case 210. Once all of the additions are entered, and the user is satisfied with the completeness and veracity of the information, the user may add the case 210 to information management system 10 by clicking on Submit button 616. To return to the Trial. Management window 110 without submitting any of the additions, an All Active Cases link 614 may be selected on the Add/Edit A Case window 600. Clicking on the All Active Cases link 614 will return the user to the Trial Management window 110.

B. Deleting a Case from the Trial Management Window

Figure 6:
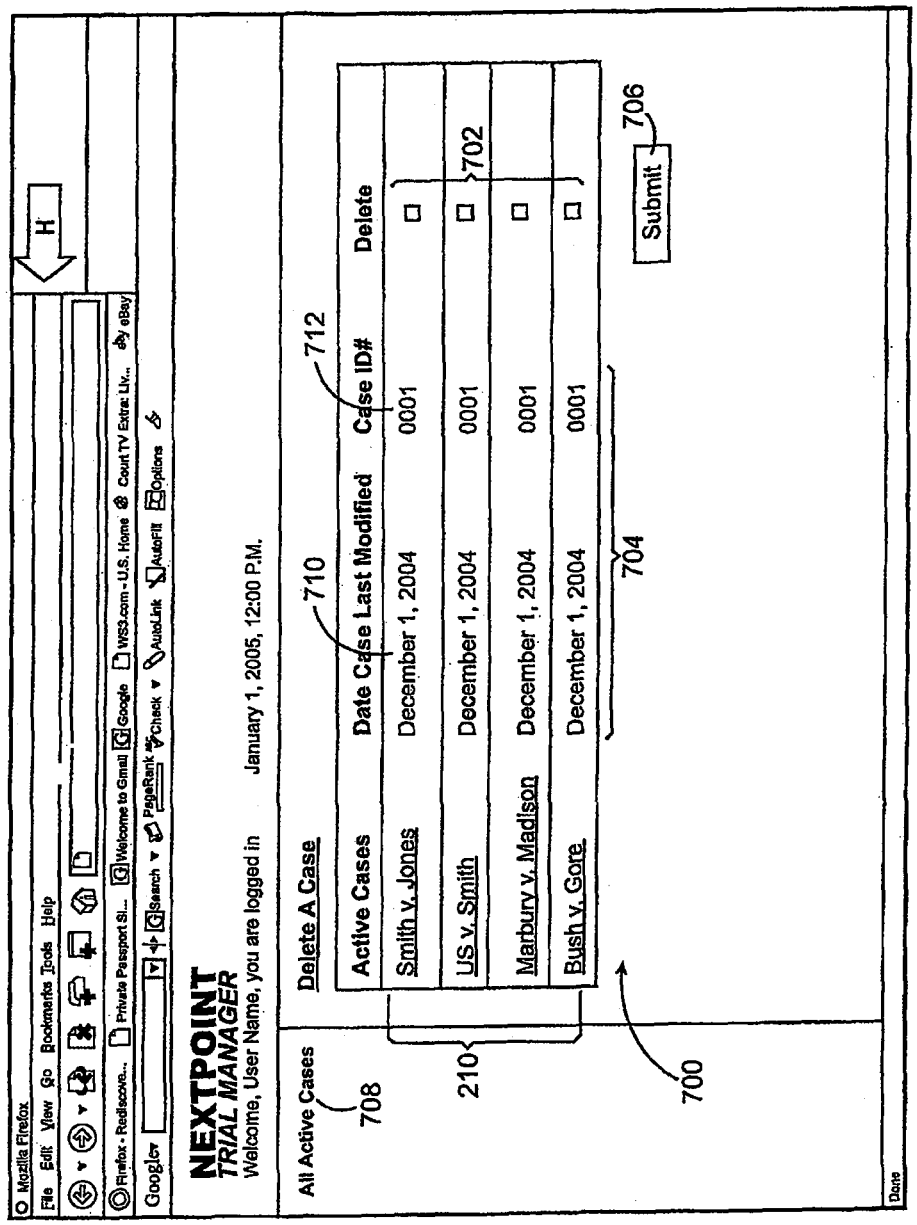
FIG. 6 shows an exemplary screen shot of a Delete A Case window for use with the first embodiment of the present invention.

To aid a user in deleting a specific case 210 from the system 10, a Delete A Case window 700 may be provided, which can be accessed by selecting delete case link 216 provided in Trial Management window 110. The Delete A Case window 700 may include various information used to identify a specific case 210. In the embodiment depicted in FIG. 6, Delete A Case window 700 includes a list of active cases 210. Each active case 210 is a link that will direct the user to the respective trial information as described below. Each case 210 has corresponding identification information 704, such as a last modified identifier 710 and Case ID 712. Each case 210 also has a corresponding delete box 702. To delete a particular case 210 from information management system 10, a user may check the delete box 702 that corresponds with the case 210, and press the Submit button 706. If a user wishes to return to the Trial Management window 110 without submitting any deletions, the All Active Cases link 708 may be selected. Clicking on the All Active Cases link 708 will return the user to the Trial Management window 110.

III. Managing/Editing Specific Cases

Figure 7:
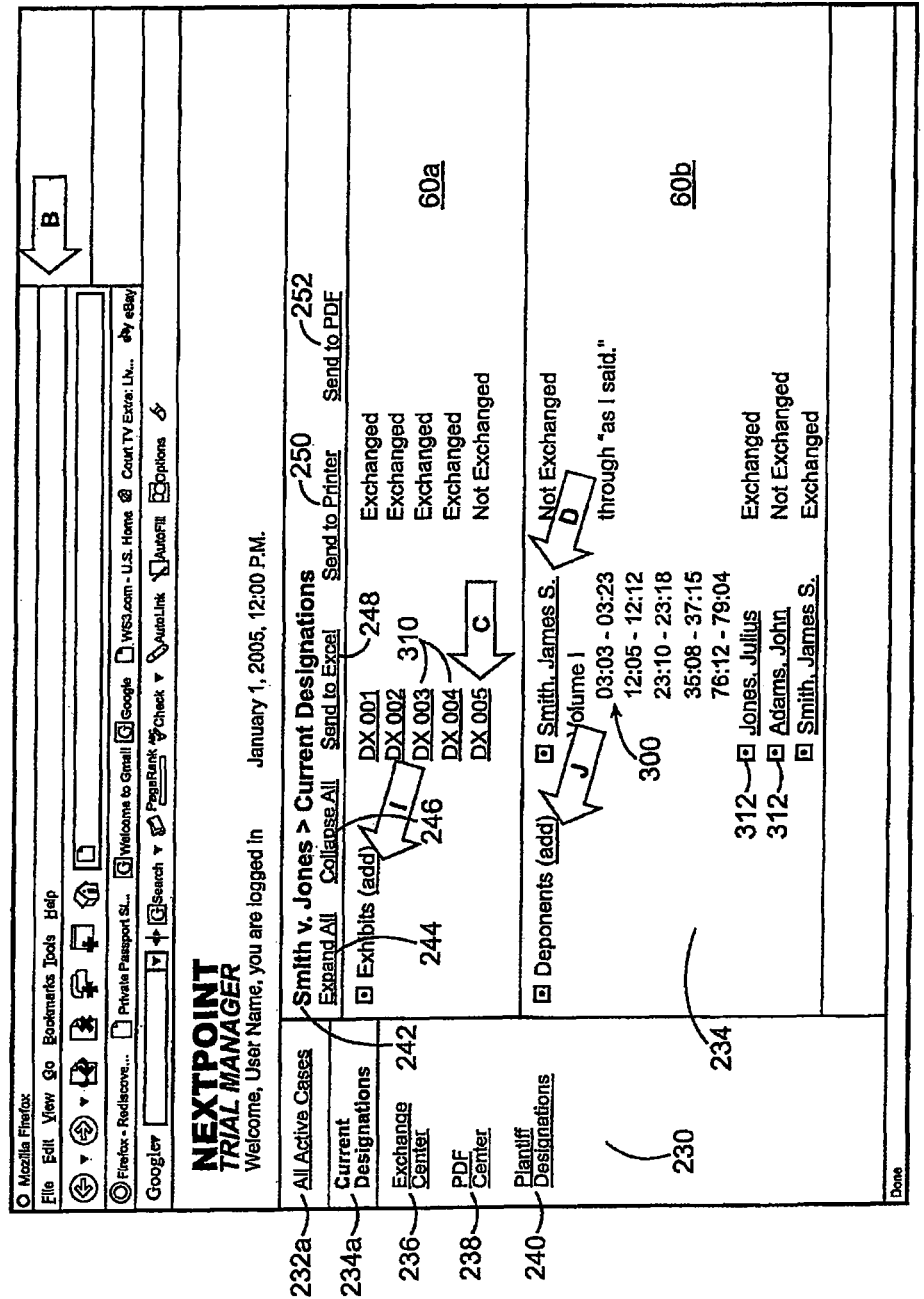
FIG. 7 shows an exemplary screen shot of a Current Designations window for use with the first embodiment of the present invention.

To access a specific case 210, the user may click on the case link 210 provided, for example, in the Trial Management window 110. As shown in FIG. 7, clicking on a case link 210 allows the user to access various trial information 60, such as exhibits 60a and deponents 60b and any other evidentiary material, court filings, transcripts or materials generated in the preparation for and participation in a trial. Exhibits 60a may include items such as court dockets, key dates, contact information and service lists, court information, or any other information needed to participate in a trial as would be known to a person familiar in the art. Deponents 60b may include fact witnesses, expert witnesses, third party witnesses, etc. Moreover, once the user accesses a specific case 210, the browser 40 displays various information, links and columns, including the Case Name 242, a Navigation bar 230 and links for various functions, such as Expand All link 244, Collapse All link 246, Send To Excel link 248, Send To Printer link 250 and Send To PDF link 252. It will be appreciated by those in the art that software application 30 is designed to allow for the delivery of data in any application that is necessary or desirable for the user. As such, navigation bar 230 may comprise any number of additional "send to" links not specifically detailed above, such as a Send to Email link, Send to Lotus 1-2-3 link, etc. In the depicted embodiment, selecting Expand All link 244 will reveal all data currently contained within the relevant fields. Selecting Collapse All link 246 simplifies the interface by hiding all data contained within the relevant fields except the top level of data. Selecting Send to Excel link 248 will export the data to a Microsoft® Excel spreadsheet. Selecting Send to Printer link 250 will send the data to the printer specified by the user's operating system. Selecting Send to PDF link 252 will create a .pdf file comprised of the data. The .pdf file may display the data in a format that is easily read and/or understood by the user (such as graphs, tables, paragraphs or other report-like displays).

For allowing the user to access different functions of the system 10, the Navigation bar 230 includes links to windows for All Active Cases 232, Current Designations 234, Exchange Center 236, PDF Center 238 and Plaintiff Designations 240, which will be discussed in more detail below.

A. Current Designations

FIG. 7 depicts a Current Designations window 234, which can be activated by selecting a Current Designations link 234a. The status for each of the exhibits 60a and deponents 60b shown in activity window 60x may also be shown. For example, in FIG. 7 the status for each of the exhibits 60a and deponents 60b may be either "Exchanged" or "Not Exchanged." In addition, specific deposition excerpts 300 may be identified for one or more of the deponents 60b that are listed and selected by the user. The Current Designations window 234 may also include links for various functions, such as Expand All link 244, Collapse All link 246, Send To Excel link 248, Send To Printer link 250 and Send To PDF link 252, each of which is described above.

1. Adding an Exhibit

To add an exhibit 60a to an existing case 210, an Add Exhibits window 800 may be provided, which can be accessed by selecting an Exhibits (add) link 260a provided in the Current Designations window 234, and is shown in FIG. 7. The Add Exhibits window 800 may include various information used to identify a specific exhibit that the user wishes to add to the system 10. In the embodiment depicted in FIG. 8, the Add Exhibits window 800 includes prefix space 802 and number space 804. By filling out prefix space 802, exhibit 60a will be categorized with other similar types of exhibits. By filling out number space 804, exhibit 60a will be listed in numerical order within its category. Add Exhibits 800 window may also include status information 806, which depicts the exchange status of the particular exhibit 60a. Add Exhibits 800 window may also comprise history box 808, which includes information such as when and by whom exhibit 60a was added to information management system 10. As users key in or modify data, the date and time of these modifications will be associated with the particular record. To access the record of these changes, history box 808 also comprises activity history link 812, which allows users to view the past activity that has been logged by application 30. Finally, the Add Exhibits window 800 comprises notes space 814, which allows a user to add any additional information that may be pertinent to the exhibit 60a. Once all of the desired information is entered by the user, he or she may save the information on system 10 by clicking the Save button 816. If the user wishes to send the information to the Exchange Center window 236b (described below), he or she may click on Send to Exchange Center box 818 prior to clicking the Save button 816.

2. Adding a Deposition

Figure 9:
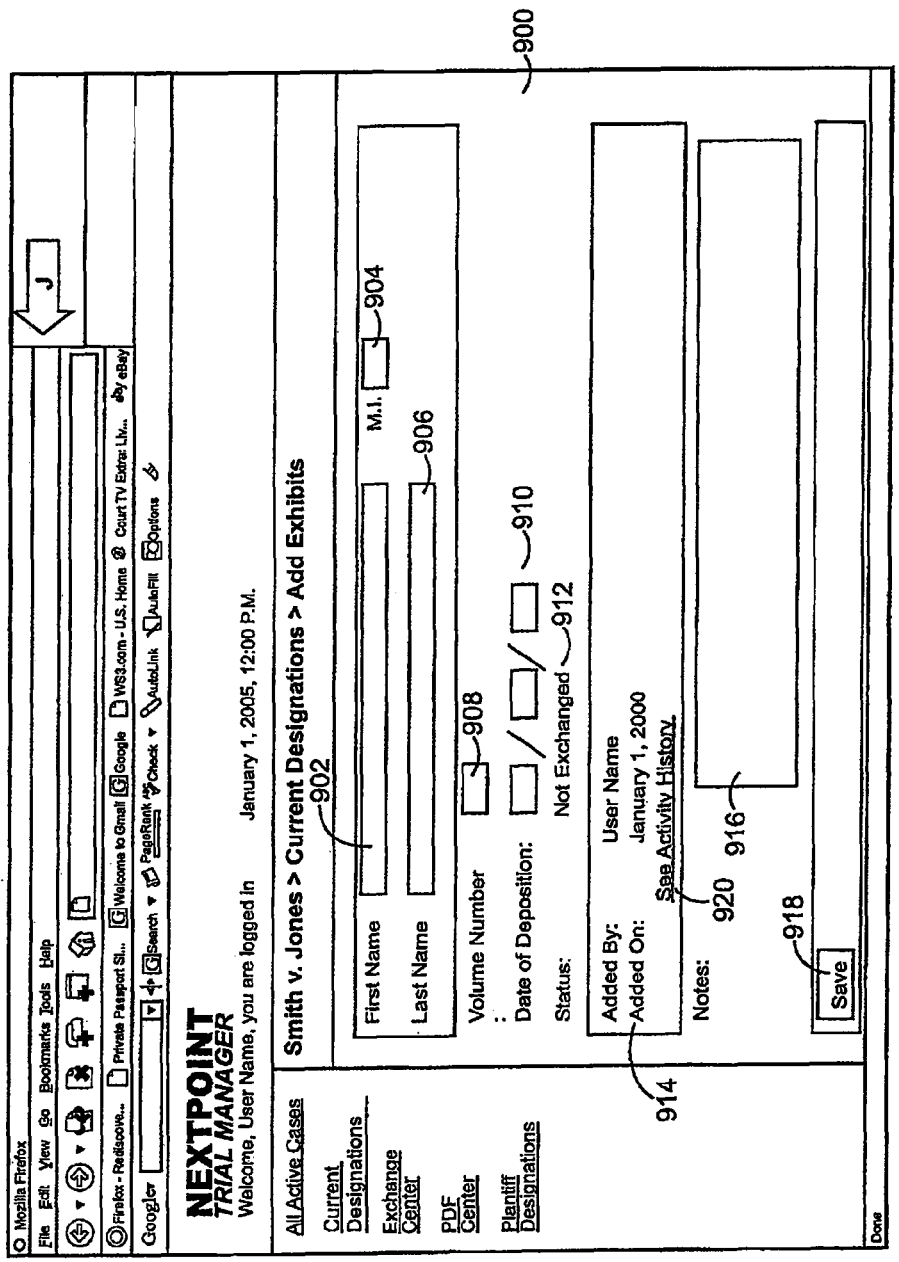
FIG. 9 shows an exemplary screen shot of an Add Deposition window for use with the first embodiment of the present invention.

To add a deposition 60b to an existing case 210, an Add Deposition window 900 may be provided, which can be accessed by selecting a Deponents (add) link 260b provided in the Current Designations window 234. The Add Deposition window 900 may include various information used to identify a specific deposition that the user wishes to add to information management system 10. In the embodiment depicted in FIG. 9, the Add Deposition window 900 includes a first name space 902, middle initial space 904 and last name space 906. These spaces 902, 904 and 906 allow the user to input the name of the deponent, and better identify a particular deposition 60b. The Add Deposition window 900 may also include volume number box 908, which provides the volume number associated with a particular deposition transcript, as well as date box 910, which allows the user to input the date on which the deposition was taken. The Add Deposition window 900 may also include status information 912, which depicts the exchange status of the particular deposition 60b. The Add Deposition window 900 may also comprise history box 914, which includes information such as when and by whom deposition 60b was added to information management system 10. History box 914 may also comprise activity history link 920, which, like history link 812, allows users to view the past activity that has been logged by application 30. Finally, the Add Deponents window 900 comprises notes space 916, which allows a user to add any additional information that may be pertinent to the deposition 60b. Once all of the desired information is entered by the user, he or she may save the information on the system 10 by clicking on Save button 918.

3. Exhibit and Deponent Records

Figure 8:
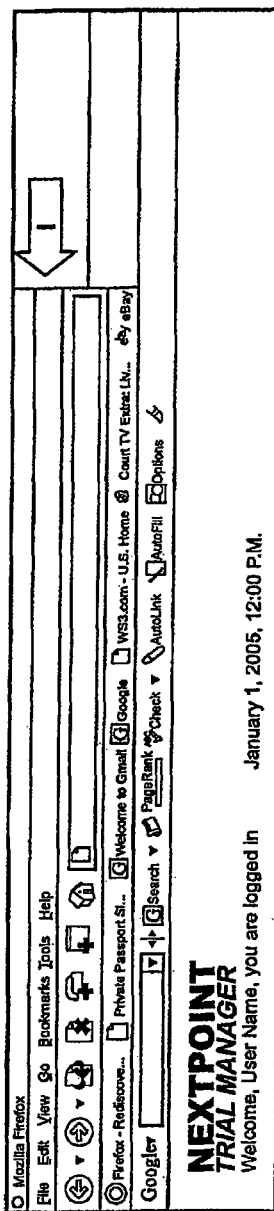
FIG. 8 shows an exemplary screen shot of an Add Exhibits window for use with the first embodiment of the present invention.
Figure 11:
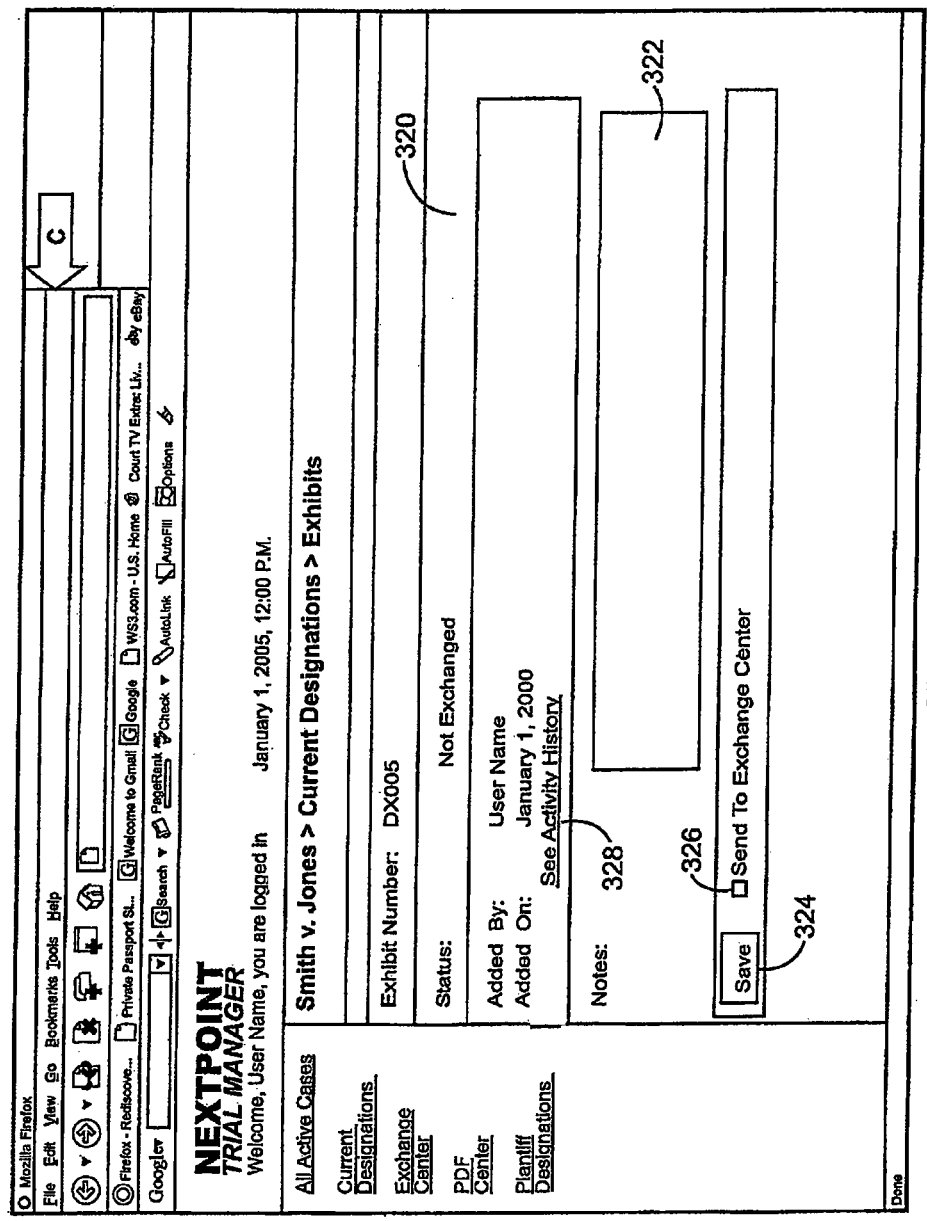
FIG. 11 shows an exemplary screen shot of an Exhibit Number window for use with the first embodiment of the present invention.

As shown in FIGS. 8 and 11, each of the listed exhibits 60a or deponents 60b may also include an exhibit number 310 or a deponent name 312. Moreover, the exhibit number 310 and deponent name 312 may also serve as links to additional information. For example, FIGS. 12 and 13 show examples of the detailed information that may be associated with a particular link to an exhibit 60a or deponent 60b, respectively.

More specifically, FIG. 11 depicts an Exhibit Number window 320 associated with a specific exhibit record 322. The Exhibit Number window 320 may be accessed by selecting the exhibit number 310 link. The Exhibit Number window 320 contains an exhibit record 322 for a specific exhibit 60a and may include information, such as the exhibit number, the status of the exhibit, i.e., "Exchanged" or "Not Exchanged", when and by whom the record was last edited, and notes by the user. For allowing the user to track past activity for a particular exhibit 60a, the Exhibit Number window 320 may also include a See Activity History 328 link. To save the recent changes to the Exhibit Number window 320 associated with a particular exhibit 60a, the Exhibit Number window 320 may include a Save link 324. For allowing the user to designate where the information for a particular exhibit 60a is saved or sent, the user may also select a Destination box 326. The Destination box 326 may cause the exhibit record 322 to be sent to the Exchange Center 236 or other destinations that may be defined by the system 10.

Figure 12:
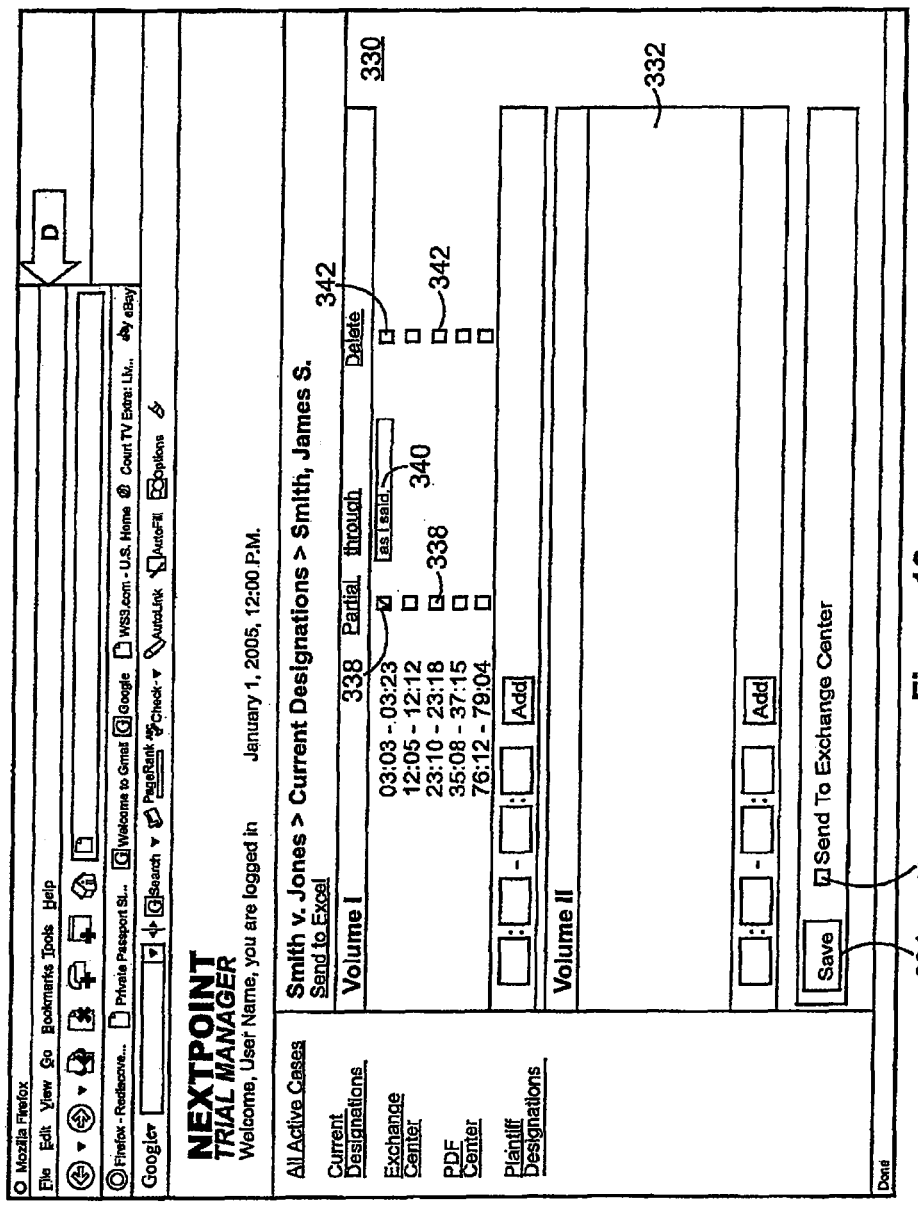
FIG. 12 shows an exemplary screen shot of a Deponent Name window for use with the first embodiment of the present invention.
Figure 13:
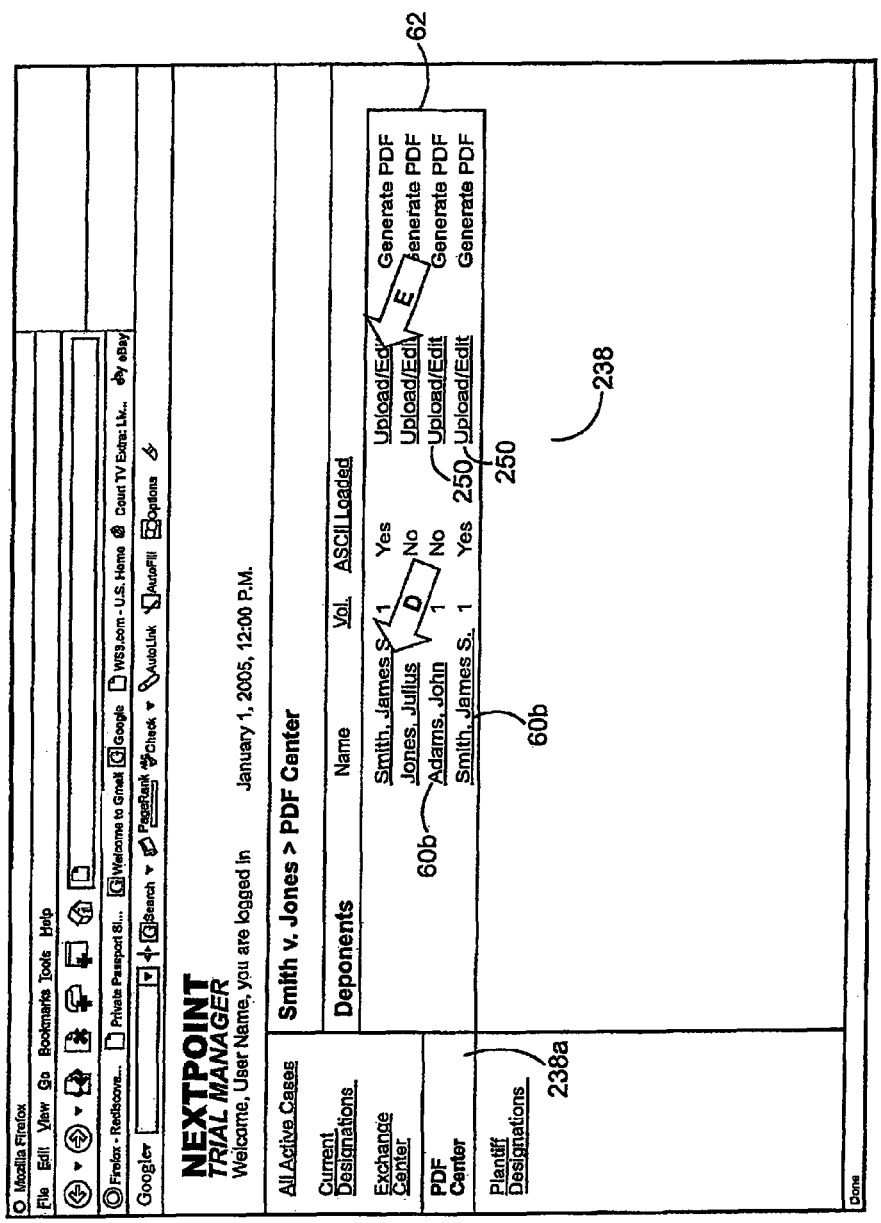
FIG. 13 shows an exemplary screen shot of a PDF Center window for use with the first embodiment of the present invention.

FIG. 12 depicts a Deponent Name window 330. The Deponent Name window 330 may be accessed by selecting the Deponent Name link 312, as shown in FIG. 7. The Deponent Name window 330 contains information related to a deponent record 332 for a specific deponent 60b and may include information, such as the deponent name, the volume corresponding to the deposition transcript that is being referenced and specific references to deposition excerpts from the respective deposition transcript. For designating specific deposition excerpts 344 of deposition transcripts, a Partial box 238 may be included. If the Partial box 338 is checked, a box opens and the last several words of the deposition excerpt 344 that is being designated may be included therein. To delete a deposition excerpt 344 that has been previously designated, a Delete box 342 may be included. If the user checks the Delete box 342, the deposition excerpt 344 associated with that box will be deleted. To save the recent changes to the Deponent Name window 330 associated with a particular deponent 60b, the Deponent Name window 330 may include a Save link 334. For allowing the user to designate where the information for a particular deponent 60b is saved or sent, the user may also select a destination box 336. The destination box may cause the deponent record 332 to be sent to the Exchange Center 236 or other destinations that may be defined by the system 10.

B. Exchange Center

Figure 10:
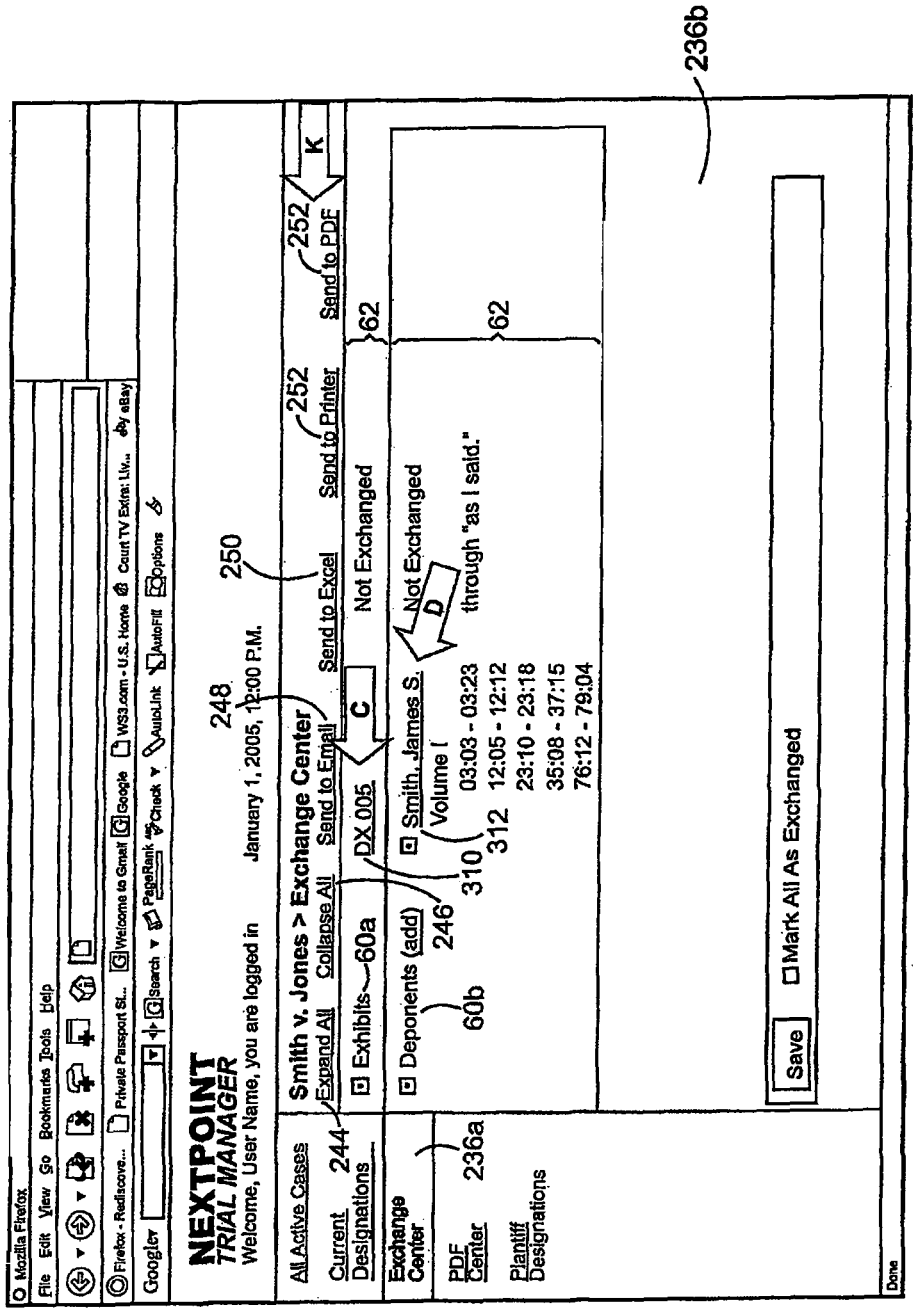
FIG. 10 shows an exemplary screen shot of an Exchange Center window for use with the first embodiment of the present invention.

To track the exchange of exhibits 60a and deponents 60b, an Exchange Center window 236b may be provided. To access the Exchange Center window 236b, the Exchange Center link 236a may be selected. FIG. 10 depicts the Exchange Center window 236b. As shown in FIG. 10, the Exchange Center window 236b also includes sections 62 that list information related to exhibits 60a, deponents 60b or other forms of trial information 60. The section 62 that relates to exhibits 60a lists them by exhibit number and the status of the exhibits 60a, i.e., "Exchanged" or "Not Exchanged." In addition, various other information that may be pertinent to the relevant exhibit 60a may also be processed in the Exchange Center window 236b. For example, specific deposition excerpts 300 may be identified for one or more of the deponents 60b that are listed and selected by the user. The section 62 that relates to deponents 60b lists them by name and may also include the status of the deponents 60b, i.e., "Exchanged" or "Not Exchanged." The deponents 60b that are listed may also be links that when selected, display the deposition excerpts 344 that are being designated for use at trial.

As will be apparent to those in the art, exchange center is an area where designations that are intended to be exchanged may be staged prior to their transfer to the opposing party. The exchange center may also integrate into an exchange center for opposing counsel, should both firms be using application 30. This allows the user to complete its "current designations", send the documents to the "exchange center" where the user can confirm that the designations are correct. Once confirmed, the user can then transfer the documents to the opposing party. On the inverse, if the user receives designations from the opposing party, the user may approve the incoming designations in the exchange center—essentially signing off on their receipt—and then the user may populate the users version of application 30.

The Exchange Center 236 window may also include links for various functions, such as Expand All link 244, Collapse All link 246, Send To Excel link 248, Send To Printer link 250 and Send To PDF link 252.

C. PDF Center

To assist in the exchange of exhibits 60a and deponents 60b, a PDF Center window 238 may be provided, which may be accessed by selecting the PDF Center link 238a. FIG. 13 depicts the PDF Center window 238. As shown in FIG. 13, the PDF Center window 238 also includes status panel sections 62 that list information related to exhibits 60a and deponents 60b. The status panel sections 62 may include information about the volume in which a particular deponent 60b is located and whether the deponent 60b is ASCII loaded. It will be appreciated by those in the art that there are other transcript delivery formats that may be proprietary to court reporters. Some of these are already "synched" with video time codes. For example, the transcript file does not have to be an ASCII file, it may also be a word file, html page or any number of other formats that are capable of being used with application 30.

For storing deposition transcripts and editing the excerpts of those transcripts that may be designated for use at trial, the status panel sections 62 may also include an Upload/Edit link 250. Selecting Upload/Edit link 250, for example, may open a separate window, dialogue box or other mechanism by which the user would select the correct file on the user's hard drive, network location, or other storage location where the transcript exists. This window, dialogue box or other mechanism may then allow the user to edit the excerpt, and store the newly edited excerpt. The PDF Center window 238 may also include a link for generating PDF copies of the designated excerpts, which may be stored, exported for use by another system, e-mailed or printed by the user. It should also be understood by those with skill in the art that other functions may also be included in the PDF Center window 238 or that other data formats may be employed thereby requiring a different kind of document to be generated, such as MS Word files (*.doc), WordPerfect files (*.wpd), XML or HTML files, or any word or text processing format. The PDF Center window 238 may also include links for various functions, such as Expand All 244, Collapse All 246, Send To Excel 248, Send To Printer 250 and Send To PDF 252, as described above.

Figure 14:
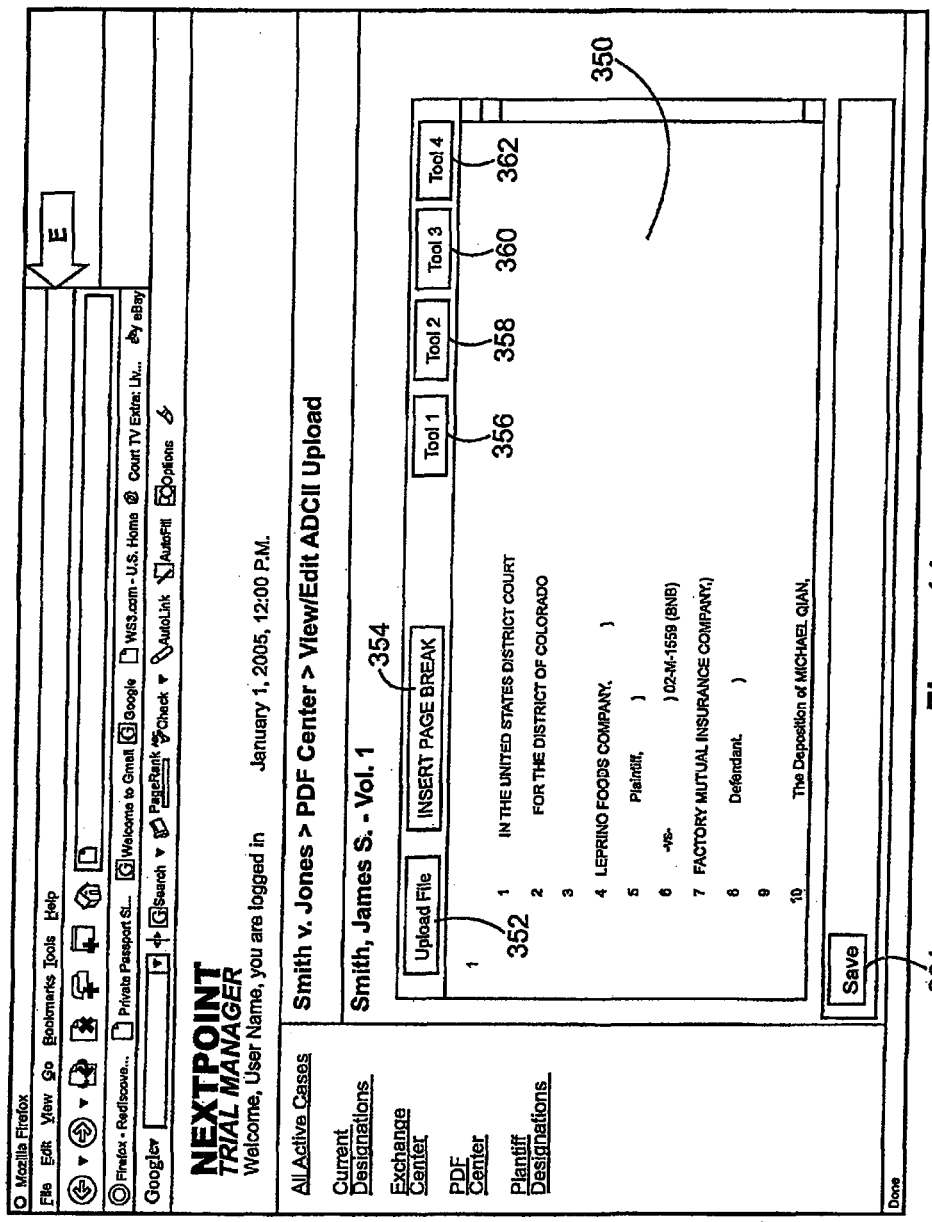
FIG. 14 shows an exemplary screen shot of an Upload/Edit window for use with the first embodiment of the present invention.

As mentioned above, to store or edit deposition transcripts, the Upload/Edit link 250 may be selected. FIG. 14 depicts the Upload/Edit window 350. As shown in FIG. 14, the Upload/Edit window 350 may include an Upload File link 352, an Insert Page Break link 354 and links to various tools, such as Tool 1 356, Tool 2 358, Tool 3 360, Tool 4 362 and Save 364. Selecting the Upload File link 353 causes the transcript for a particular deponent to be uploaded and stored. As will be appreciated by those in the art, the uploaded transcript can be stored locally, on external storage devices or media, on remote third-party servers or, if available, on court-reporting servers. The uploaded transcript may be stored in any format compatible with or readable by application 30. The Insert Page Break link 354 allows the user to format the transcript as loaded into application 30 such that the page breaks are consistent with the official transcript. Tool 2 link 358 may be provided to allow the user to make modifications to the underlying transcript file. Tool 3 link 360 may be provided to allow the user to change the line numbers within the transcript. Tool 4 link 362 may be provided to allow the user to change other formatting options, such as indentations, as necessary. It will be appreciated that the Tool 1, 2, 3 and 4 links can be modified by the user to accomplish most any task, and the above description is illustrative only. Moreover, it will further be appreciated that these tasks may be completed by software application 30 automatically, without input from the user. To save the edited version of a deposition transcript, the user may select the Save link 364. If the Save link 364 is selected, the edited version of the deposition transcript will be stored either locally or at a remote server as described above. It should be understood that Upload/Edit window 350 may also include other links to various functions that may be required to store and edit the deposition transcripts for later use or designation by the user.

It will be appreciated by those in the art that deposition transcripts are originally stored as various types of file formats. Even if the transcripts are in the same type of file format, they may be arranged in a different layout. The file type, and the organization of the document, may be determined, for example, by the governing court, or the company that provided the reporting service. By way of example and as stated above, the deposition transcript of a first witness may be stored as an ASCII file, while the deposition transcript of a second witness may be stored as a .doc file, or a .txt file.

As a second example, the deposition of a first witness may be stored as an ASCII file, while the deposition transcript of a second witness is also be stored as an ASCII file. However, the organization of the two transcripts may be completely different. For example, the first page of the first transcript may include the name of the court, the caption of the relevant case and the person being deposed, while the first page of the second transcript may include the name of the court, the name of the relevant circuit, the presiding judge, the parties, the file number of the case and the date of the deposition. More likely than not, any information that is identical between these two transcripts will not be located at the same place on the front page. Additionally, the two transcripts may differ in whether the lines on the page are numbered, the number of lines per page, whether the pages are numbered, etc.

In order accommodate the multiple types of files and layouts in which transcripts may be stored, and to make electronic searching and display of the transcripts more efficient, the present invention includes parser 5000. Generally, a user uploads a deposition transcript into system 30, regardless of the file type or layout of the document in which the transcript is stored. Parser 5000 then parses the transcript and searches for the location of various identifying or descriptive metadata contained within the transcript. Once the type and location of this metadata is determined, parser 5000 stores the information in a relational database 5010. Using this stored information, system 30 can easily search multiple transcripts, regardless of the type of file format or layout it was originally stored in, for various information. By way of example, if 30 deposition transcripts have been uploaded to system 30, each transcript comprising the deposition of a different person, system 30 can use the information stored in relational database 5010 to search for each use of a specific phrase that is important to the case. Additionally, system 30 can use the information stored in relational database 5010 to manipulate the uploaded transcripts according to parameters provided by the user. By way of example, system 30 can display the transcript either in its native layout or in a layout that is uniform for all uploaded transcripts. System 30 could also display limited segments of the transcript, or any other display that is required by the user.

To accomplish this uniform parsing, the user first uploads a deposition transcript. It will be appreciated by those in the art that multiple transcripts may be uploaded simultaneously. Because parser 5000 requires no basic information about any deposition transcript to be manually inputted into system 30, uploading multiple transcripts simultaneously greatly increases the efficiency of both the user and system 30.

Once uploaded, the transcript is analyzed by parser 5000, which extracts and stores various metadata for use in displaying, searching and further parsing of the transcript later. Where applicable, the various metadata may include, but not be limited to: the deponent's first name, the deponent's last name, the deponent's middle initial, the deponent's name suffix, the number of volumes into which the deposition was broken down, the date on which the deposition was taken, the maximum number of lines per page, the number of the start page, whether the transcript contains page breaks, whether the transcript has page numbers at the top, alternate page number location, page number alignment (i.e., where the are displayed on the page), line number location, line number alignment, timestamp location, timestamp alignment, etc. Detailed explanations of some of these steps follow.

Find page breaks—this is relatively self-explanatory. Parser 5000 reviews the metadata attached to each deposition transcript and determines if the transcript includes any page breaks, and if so, the position of those page breaks.

Find deponent name—again, this is relatively self-explanatory. Parser 5000 reviews the metadata, and searches several different patterns for name recognition on the cover page of the transcript. Patterns may differ for each meta-value, but, by way of example, for names, parser 5000 may employ various text parsers that may comb the first page for the words "name" or "deponent," and find nearby text that match typical name patterns such as 'John A. Doe' or 'Doe, John A.'. Multiple and various filters may be employed, each searching for common variances, such as 'Von Per Ohe,' 'O'Smith,' etc.

Find date—again, parser 5000 searches the cover page and compares the information there with several patterns for date recognition that are programmed into parser 5000, such as January 1, 2008, 01/01/2008, 1 January 2008, etc.

Find volume—often, transcripts are rather lengthy, and must be broken into multiple volumes. Parser 5000 may search the transcript, or just the first page, and compare the information found with several patterns for volume recognition that are programmed into parser 5000. By way of example, parser 5000 may search for 'volume' and related number following multiple well known and often used patterns in transcript formats.

Analyze lines—in this step, parser 5000 will parse through a set number of lines in the beginning of the transcript, a set number of lines in the middle of the transcript and a set number of lines at the end of the transcript, searching for consistency or patterns in attribute locations and alignments. By way of example, parser 5000 may parse through the first 1,000 lines of text, the middle 1,000 lines of text and the last 1,000 lines of text in a transcript that contains over 5,000 lines of text. In this manner, parser 5000 will decipher the layout of a transcript and store the metadata accordingly. Understanding the layout of a transcript will for easy searching and manipulation by the user at a latter date.

By way of example, and in no way limiting, if the phrase "a man was standing on the corner of the intersection" was said during a deposition, a typical parsing program could not find that phrase if "a man was standing" was on one line, while "on the corner of the intersection" was the subsequent line. The reason for this is because a typical deposition transcript may look like this:

21 12:04:32 . . . text text text text a man was standing
22 12:04:35 on the corner of the intersection . . . .

Typically, traditional text parsing mechanisms begin at the first line of a document and continue line by line until the end of the file. As such, a typical parsing program will read line 21 to 22 as "a man was standing line break line number time stamp tab on the corner of the intersection." As seen, a typical parsing program will not differentiate the important text "a man was standing" and "on the corner of the intersection" from the metadata present, "line break line number time stamp tab."

By analyzing these same lines, parser 5000 will, in contrast, determine that "line break," "line number" "date stamp" and "tab" are not textual characters but rather metadata used to determine the layout of the transcript, thus allowing system 30 to search the text of the documents for phrases that span multiple lines by ignoring or removing metadata information from the text.

It will be appreciated by those in the art that the scope of the present invention includes the use of multiple methods to analyze the lines. By way of example, in looking for consistency in attribute locations and alignments, parser 5000 may parse the first 1,000 lines, skip the next 500 lines, then parse 1,000 lines, then skip 500 lines, etc.

Determine page numbering scheme—using the line analysis from above, parser 5000 may parse the beginning of transcript and determine where and how the pages are numbered.

Find start page number—by determining the page numbering scheme, parser 5000 finds the beginning page number. As will be appreciated by those in the art, the beginning page number is often page 1. However, in transcripts that have multiple volumes, the volumes after volume 1 typically do not begin on page one.

Once parser 5000 analyzes the original transcript looking for any or all of the above metadata, or any other such identifying criteria that the user requires, the type of metadata found, and the location of the metadata, is stored in relational database 5010. Because database 5010 contains all of the pertinent information from the original transcript, but now stores that information in an uniform and easily-read format, parser 5000 may now employ any traditional text parsing mechanism to extract the metadata and page/line data from database 5010.

Because the pertinent information is stored in relational database 5010, a user can input search criteria, and the relevant information and transcript text can be displayed, regardless of the file format, or layout, of the original transcript.

Figure 15:
FIG. 15 shows an exemplary screen shot of an Upload/Edit window for use with a second embodiment of the present invention.

A second embodiment of software application 30 is seen in FIG. 15, in which an Upload/Edit window 350A is provided to allow a user to easily select and transfer components of a transcript. As depicted, Upload/Edit window 350A comprises transcript window 352A, which depicts various portions of a transcript. Should the user require certain portions of the transcript to be copied, the user can highlight those portions, through transcript window 352A. Once highlighted, the user can click the Add Designation button 370A in order to copy and transfer the designated portions of the transcript.

The Upload/Edit window 350A further comprises an Add Designation window 372A. The Add Designation window 372A comprises beginning page field 374A, beginning line field 375A, end page field 376A and end line field 377A. If the user knows the beginning and ending pages and lines that the user wishes to designate, the user may add the information in fields 374A through 377A, rather than highlighting the portions in window 352A. Once the desired portions are designated, the user can click the Add Designation button 370A in order to transfer the designated portions.

D. Plaintiff Designations

To assist in the designation of specific excerpts of a deposition transcript for use at trial by various parties to the litigation, a Plaintiff Designations window 240 may be provided, which can be accessed by selecting the Plaintiff Designations link 240a. FIG. 16 depicts the Plaintiff Designations window 240. It should also be evident to those with skill in the art that similar windows may also be included for other parties, such as co-plaintiffs and co-defendants. As shown in FIG. 16, the Plaintiff Designations window 240 may also include status panel sections 62 that include information related to exhibits 60a and deponents 60b. Similar to the Current Designations 234 window, the Plaintiff Designations 240 window may display the exhibits 60a by exhibit numbers and the deponents 60b by deponent name. The deponent name may also act as a link to the specific deposition excerpts 344 from the deponents transcript, which are being designated for trial. The Plaintiff Designations 240 window may also include links for various functions, such as Expand All 244, Collapse All 246, Send To Excel 248, Send To Printer 250 and Send To PDF 252, as described above.

E. Designations Management

Figure 17:
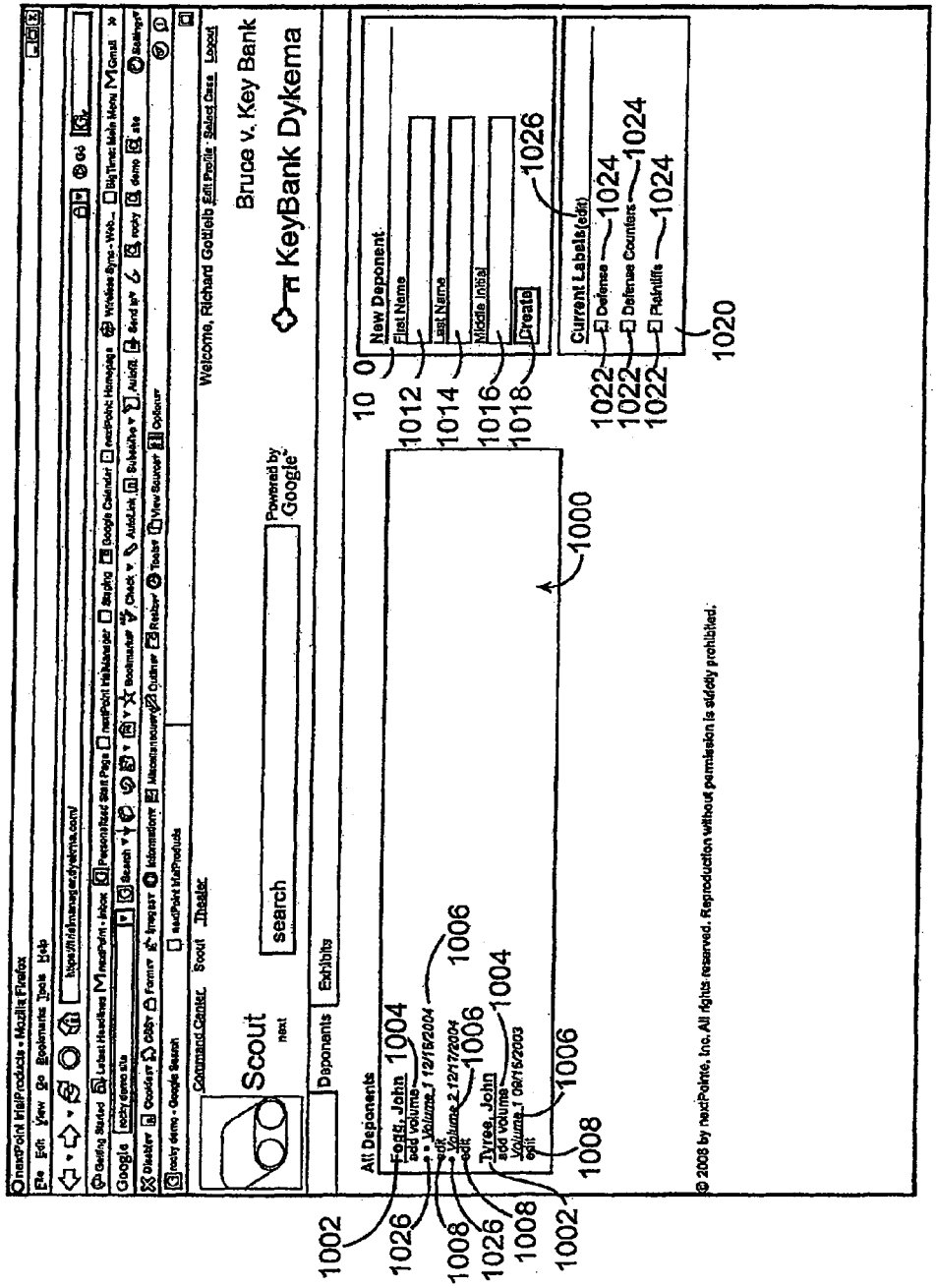
FIG. 17 shows an exemplary screen shot of an All Deponents window for use with an embodiment of the present invention.

A further embodiment of the present invention is depicted in Figures A to C. As seen in FIG. 17, to assist a user in uploading and preparing a deposition transcript for trial, an All Deponents window 1000, a New Deponent window 1010 and a Current Labels window 1020 may be provided. To allow a user to create a new deponent, a First Name field 1012, a Last Name field 1014 and a Middle Initial field 1016 may be provided within the New Deponent window 1010. Once fields 1012, 1014 and 1016 are populated with the appropriate information, the user may click on a Create link 1018, which will create a deponent, and add a new Deponent Name 1002 to the All Deponents window 1000.

Like the previous embodiments discussed above, to allow a user to upload a deposition transcript associated with a Deponent Name 1002, the Add Volume link 1004 may be provided for each Deponent Name 1002. After clicking on the Add Volume link 1004, an Upload/Edit window (not shown) will open that depicts one or more portions of a deposition transcript. Should the user require certain portions of the transcript to be uploaded, the user can highlight those portions. Once highlighted, the user can click the Add Designation button (not shown) in order to copy and transfer the designated portions to application 30.

The Upload/Edit window (not shown) may further comprise an area for adding a designation. As an alternative to highlighting the desired portions of the deposition transcript, if the user knows the beginning and ending pages and lines that the user wishes to designate, the user may add the information in fields provided in the Upload/Edit window (not shown). Once the desired portions are designated, the user may upload the designated portions to the respective Deponent Name 1002.

As is well known in the art, deposition transcripts may be stored in a variety of different document formats, such as: .doc files; .pdf files, ASCII files, etc. As also known in the art, there are a variety of ASCII file types that may be used to store deposition transcripts. As such, system 10 may be provided with a module that includes a parser program. When a deposition transcript is uploaded, the parser program compiles the deposition transcript and converts it to a standard format. In this manner, regardless of in which format, or which variety of ASCII file, the deposition transcript was originally stored, system 10 will display each deposition transcript associated with each Deponent Name 1002 uniformly, and allow the user to edit (as discussed below) the deposition transcript as needed.

Once a deposition transcript has been uploaded, Volume Indicators 1006 may appear under the respective Deponent Name 1002. In this manner, the user will be able to upload, view and edit multiple deposition transcripts associated with each Deponent Name 1002.

For allowing users to select, designate or otherwise set apart specific portions of a deposition transcript, system 10 allows the user to edit a deposition transcript as needed. For example, an edit link 1008 may be provided under each respective Volume Indicator 1006 that allows the user to designate, highlight or otherwise edit certain portions of a deposition transcript, as well as synchronize a video deposition with its written portion. Therefore, clicking on the edit link 1008 will open Deposition window 2000, which includes links and buttons for performing the various functions mentioned above.

As stated above, system 10 allows a user to make multiple designations related to the same portion or portions of a deposition transcript. In order to easily determine which designations have been assigned to a portion of a deposition of a transcript, Current Labels window 1020 may be provided. As seen in FIG. 17, various color codes 1022 may be used. Each color code 1022 may be associated by the user with a various designation 1024.

In order to delineate which color code 1022 is associated with which designation 1024, and edit link 1026 may be provided in the Current Labels window 1020. Once the user clicks the edit link 1026, a Label Section window (not shown) will open. The Label Section window (not shown) may display a list of color codes, hatching symbols or other indicators 1022, and associated blank fields. By populating each blank field with a designation or other various appropriate information, the user can associate each color code 1022 with a specific designation. As discussed in detail below, in this manner the user may designate a specific portion of deposition transcript in any manner, such as by party, by action, by topic, etc.

If a specific portion of a deposition transcript is somehow designated, a color code 1022 may appear next to the Volume Indicator 1006 in All Deponents window 1000. In this manner, a user will quickly be able to determine whether a specific deposition transcript associated with a Volume Indicator 1006 has been designated, and if so, how the transcript has been designated and by whom, without having to open and review each transcript.

As is known in the art, depositions may be recorded, among other media, via video. If this is the case, the system 10 allows the user to synchronize the video recording of the deposition with the written transcript.

Figure 18:
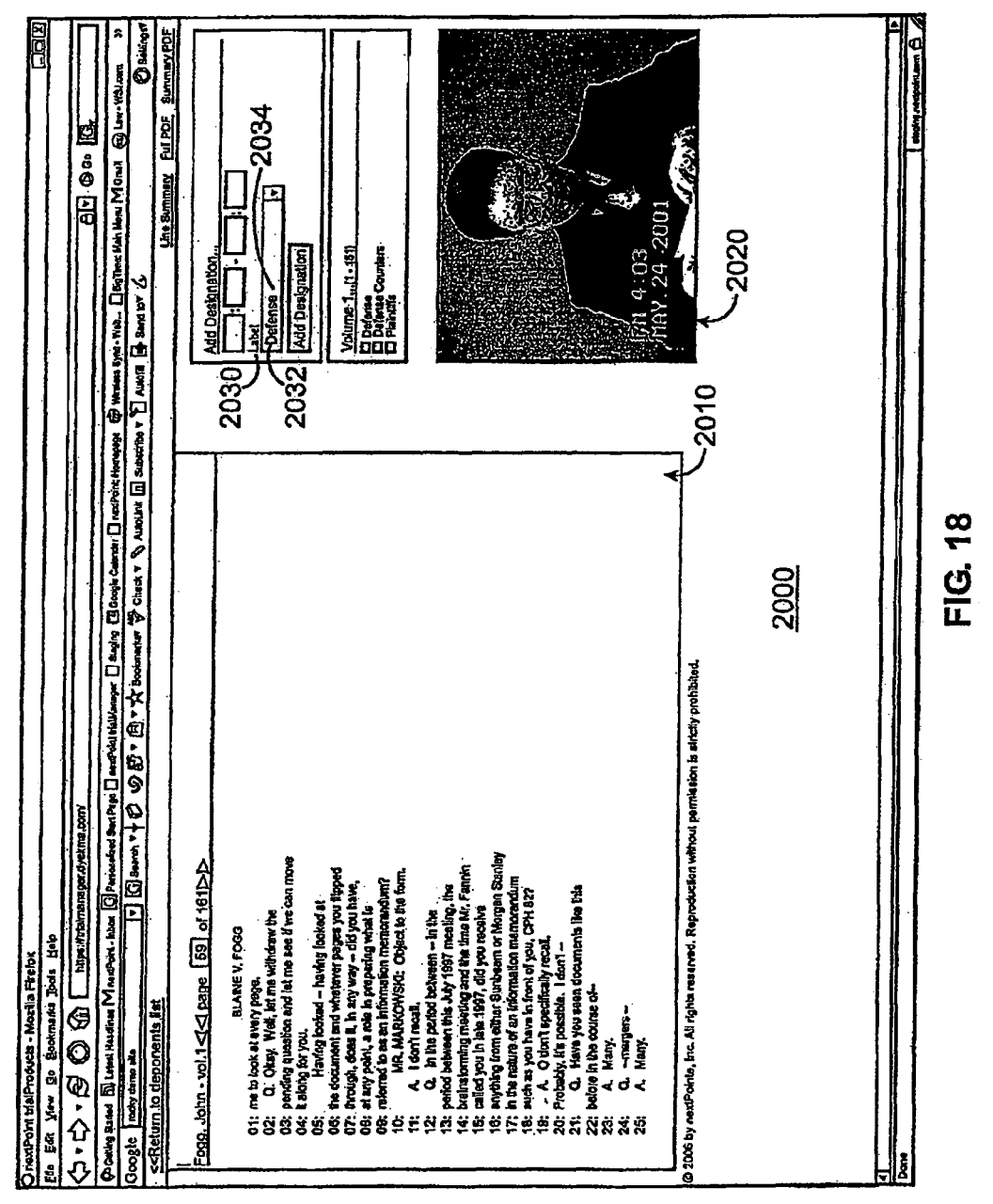

As seen in FIG. 18, and as discussed above, a Deposition window 2000 may be provided with system 10. Deposition window 2000 may include an Add Designation window 2030, which will allow a user to select and designate a specific portion of a deposition transcript. Once the specific portion is selected, the selected text portion may be displayed in Text window 2010. In this way, the user can confirm that the correct deposition portion has been selected.

Once the user confirms that the correct deposition portion has been selected, the user may chose the specific designation to be associated with the selected portion via drop-down menu 2032. Designations 2034 displayed in drop-down menu 2032, from which the user can chose, may be the same as the designations with which the user populated blank fields in Label Section window as described above. Once the user has selected the appropriate designation 2034, the user may click Add Designation link 2036 to associate the chosen designation 2034 with the selected deposition portion.

Deposition window 2000 may also include a Video window 2020. Once a portion of the deposition is selected in Add Designation window 2030, if a video deposition was taken, system 10 may display the video portion of the deposition in Video window 2020, and may do so in addition to, or in lieu of, the written portion of the deposition displayed in Text window 2010. As is known in the art, video depositions may be stored in any number of known formats, such as .wmv, .mp4, .mpeg, .swf, etc. However, system 10 will display all video depositions in a uniform manner, regardless of the format in which the video deposition was originally stored.

Figure 19:
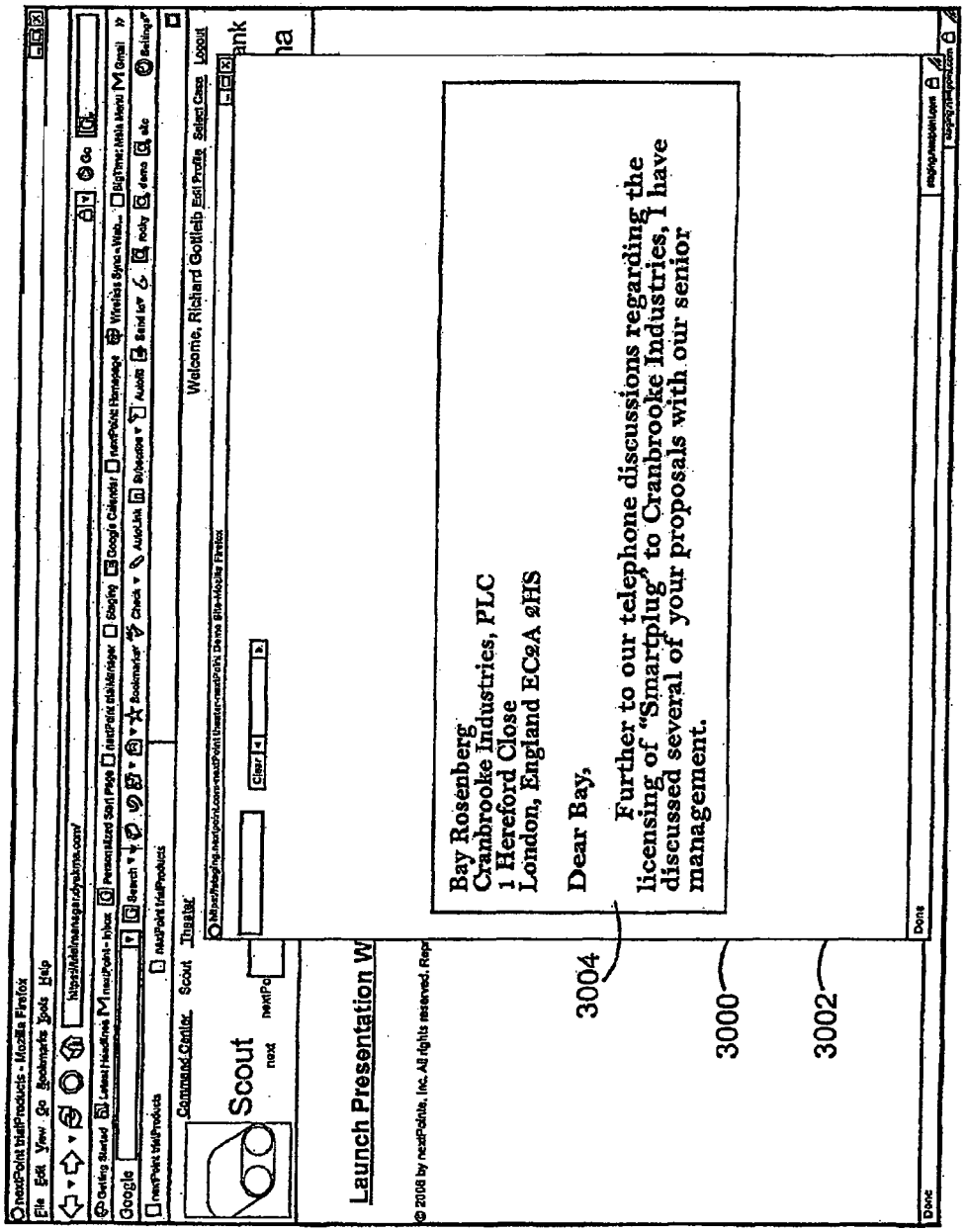
FIG. 19 shows an exemplary screen shot of an Exhibit window for use with an embodiment of the present invention.

As seen in FIG. 19, system 10 further allows a user to store, recall, manipulate and display various exhibits 3002. As will be known in the art, these exhibits 3002 may be associated with a deposition transcript, but they need not be, and may stand alone or be otherwise associated with the trial. Window 3000 also includes an Exhibit Window link 3008. If the user selects the Exhibit link, a list of Exhibits 3002 will be displayed. As seen in FIG. 19, selecting a specific exhibit 3002 will open Exhibit window 3000, in which is displayed an exhibit 3002.

As is well known in the art, certain portions of such exhibits 3002 may be more important than others. To help a user emphasize these more important sections, the user may mouse over exhibit 3002, and box the important portions. When the important portions are selected, the portion will be displayed in enlargement box 3004, which will appear embedded in Exhibit window 3000. To allow a user to further emphasize specific portions of the important sections, enlargement box 3004 will allow a user to highlight specific portions of the text by clicking on the desired text with a mouse. It will be appreciated by those in the art that the scope of the present invention includes any known means of highlighting the specific portions of the text, including, but not limited to, underlining, italicizing, changing the color of the font, bolding, etc.

While specific embodiments of the present invention have been described in detail, it will be appreciated by those skilled in the art that various modifications and alternatives to those details could be developed in light of the overall teachings of the disclosure. For example, the processes described with respect to computer executable instructions can be performed in hardware or software without departing from the spirit of the invention. Furthermore, the order of all steps disclosed in the figures and discussed above has been provided for exemplary purposes only. Therefore, it should be understood by those skilled in the art that these steps may be rearranged and altered without departing from the spirit of the present invention. In addition, it is to be understood that all patents discussed in this document are to be incorporated herein by reference in their entirety.

Accordingly, the particular arrangement disclosed is meant to be illustrative only and not limiting as to the scope of the invention which is to be given the full breadth of the appended claims and any equivalents thereof.

What is claimed is:

1. A method for collecting and managing trial information comprising the steps of:
    receiving electronically stored information related to a trial;
    storing the electronically stored information in a virtual storage location; parsing the electronically stored information by analyzing the electronically stored information and extracting various metadata;
    dividing the electronically stored information into a plurality of blocks of information, wherein each of said plurality of blocks of information comprises the smallest block of information to be processed at one time depending on type of processing required;
    accessing a cloud computing network which provisions a plurality of virtual computers, each of the plurality of virtual computers using computational resources which are available remotely over a public network; and
    providing processing instructions to each of the plurality of virtual computers to access the virtual storage location and to process a next available one of said plurality of blocks of information of the electronically stored information, wherein said providing processing instructions to each of the plurality of virtual computers comprises:
    providing processing instructions for processing the electronically stored data from the host computer to the cloud computing network;
    receiving the processing instructions by the cloud computing network and uploading the processing instructions to at least one virtual computer;
    storing, by the at least one virtual computer, of the processed electronically stored data in a storage location;
    indicating on a primary database by the at least one virtual computer where the processed electronically stored data is stored; and
    making the processed electronically stored data available to a user.

2. The method as set forth in claim 1, wherein said virtual computers comprises remote leveraging of unused computational capacity of one or more of physical servers that comprise the cloud computing network.

3. The method as set forth in claim 2, further comprising the step of releasing at least one of the plurality of virtual computers and allowing the unused computational capacity of the one or more physical servers to perform other tasks when the electronically stored information has been parsed.

4. The method as set forth in claim 1, wherein the provisioning of the plurality of virtual computers is actuated automatically, based on the occurrence of preset criteria.

5. The method as set forth in claim 1, further comprising:
   storing the metadata in a relational database that is stored on a physical server.

6. The method as set forth in claim 1, wherein said provisions a plurality of virtual computers comprises:
   sending from a host computer a request for additional computing resources to the cloud computing network;
   receiving from the cloud computing network an indication of the amount of available computing resources and the IP address for each available computing resource; and
   providing to the host computer the necessary network protocols for allowing the secure exchange of data between the host computer and the cloud computing network.

7. The method as set forth in claim 1, wherein the storage location is a physical server.

8. The method as set forth in claim 1, wherein the type of processing required is Bates Stamping and the smallest block of information is one page.

9. The method as set forth in claim 1, wherein the smallest block of information is one document.

* * * * *